US011346094B2

(12) United States Patent
Lee

(10) Patent No.: US 11,346,094 B2
(45) Date of Patent: May 31, 2022

(54) STORM DRAIN FILTERS

(71) Applicant: LANDROAD INC, Jeonju-si (KR)

(72) Inventor: Ju Seung Lee, Jeonju-si (KR)

(73) Assignee: LANDROAD INC, Jeonju-si (KR)

(*) Notice: Subject to any disclaimer, the term of this patent is extended or adjusted under 35 U.S.C. 154(b) by 5 days.

(21) Appl. No.: 17/260,604

(22) PCT Filed: Dec. 6, 2018

(86) PCT No.: PCT/KR2018/015367
§ 371 (c)(1),
(2) Date: Jan. 15, 2021

(87) PCT Pub. No.: WO2020/022587
PCT Pub. Date: Jan. 30, 2020

(65) Prior Publication Data
US 2021/0332581 A1 Oct. 28, 2021

(30) Foreign Application Priority Data
Jul. 26, 2018 (KR) .......................... 10-2018-0087215

(51) Int. Cl.
E03F 5/04 (2006.01)
B01D 35/02 (2006.01)
B01D 35/143 (2006.01)
(52) U.S. Cl.
CPC ............ E03F 5/0404 (2013.01); B01D 35/02 (2013.01); B01D 35/1435 (2013.01)
(58) Field of Classification Search
None
See application file for complete search history.

(56) References Cited

U.S. PATENT DOCUMENTS 122,209 A * 12/1871 Bashman et al. ..... E03F 5/0404
210/163
142,238 A * 8/1873 Jenings .................. E03F 9/002
210/170.03
(Continued)

FOREIGN PATENT DOCUMENTS

CN 2600511 1/2004
CN 201135655 10/2008
(Continued)

OTHER PUBLICATIONS

KIPO, Notice of Allowance of Application No. 10-2018-0087215 dated Feb. 28, 2019.
(Continued)

Primary Examiner — Robert J Popovics
(74) Attorney, Agent, or Firm — Lex IP Meister, PLLC

(57) ABSTRACT

There are provided a rainwater runoff contaminant filtration apparatus and a monitoring system therefor. According to an aspect of the present invention, a rainwater runoff contaminant filtration apparatus includes: a body in which rainwater runoff is introduced into an opening whose top end is opened and the rainwater runoff is discharged to an outlet formed on one side surface of a lower portion thereof; a filtering unit located inside the body and filtering the rainwater runoff introduced into the opening; a collecting unit connected to the filtering unit, collecting the rainwater runoff, and providing the collected rainwater runoff to an inner portion of the filtering unit; a connection sensing unit including a spring cylinder to connect the filtering unit and the collecting unit to each other and sensing a weight of the filtering unit on the basis of reciprocation of the spring cylinder; and a communication unit transmitting the weight of the filtering unit sensed by the connection sensing unit to the outside, wherein the connection sensing unit includes a contactless sensor located at an outer portion of the spring cylinder and (Continued)

a magnet located at an inner portion of the spring cylinder and moving in accordance with movement of the spring cylinder, and the communication unit transmits a signal generated by the contactless sensor sensing the magnet to the outside.

10 Claims, 15 Drawing Sheets

(56) References Cited

U.S. PATENT DOCUMENTS

| | | | | |
|---|---|---|---|---|
| 232,948 A * | 10/1880 | Dernham | ............... | E03F 1/00 210/163 |
| 248,559 A * | 10/1881 | Jackson | ............... | A61B 10/007 4/220 |
| 440,067 A * | 11/1890 | Smith | ............... | E03F 5/0404 210/163 |
| 459,259 A * | 9/1891 | Shunk | ............... | E03F 5/0404 210/163 |
| 468,714 A * | 2/1892 | Whitten | ............... | E03F 5/046 404/25 |
| 505,130 A * | 9/1893 | Ryan | ............... | E03F 5/0404 285/391 |
| 506,267 A * | 10/1893 | Sefton | ............... | E03F 5/0404 210/163 |
| 530,816 A * | 12/1894 | Wright | ............... | E02D 29/12 210/247 |
| 634,011 A * | 10/1899 | Mahony | ............... | C02F 1/78 210/153 |
| 672,868 A * | 4/1901 | Banwell | ............... | E03F 5/046 404/4 |
| 783,556 A * | 2/1905 | Van Buskirk | ......... | E03F 5/0401 404/5 |
| 809,201 A * | 1/1906 | Lutz | ............... | E03F 1/00 210/317 |
| 1,041,887 A * | 10/1912 | Schodde | ............... | E03F 5/0404 210/163 |
| 1,060,338 A * | 4/1913 | Gschwind | ............ | E03F 5/0404 404/5 |
| 1,066,316 A * | 7/1913 | Piper | ............... | B01D 61/08 404/5 |
| 1,115,016 A * | 10/1914 | Pheils | ............... | B65F 1/1447 193/11 |
| 1,207,776 A * | 12/1916 | Mcdonald | ............ | B04B 11/04 210/324 |
| 1,220,123 A * | 3/1917 | Heybach | ............. | B01D 35/153 210/136 |
| 1,245,903 A * | 11/1917 | Gross | ............... | E03F 5/046 210/163 |
| 1,471,819 A * | 10/1923 | Bauschard | ............ | E03F 5/046 404/5 |
| 1,473,551 A * | 11/1923 | Gschwind | ............ | E03F 5/046 404/5 |
| 1,654,246 A * | 12/1927 | Egan | ............... | E03F 5/046 210/163 |
| 1,654,247 A * | 12/1927 | Egan | ............... | E03F 5/046 210/314 |
| 1,659,364 A * | 2/1928 | Kelley | ............... | E03F 5/046 404/4 |
| 1,686,415 A * | 10/1928 | Lyes | ............... | E03F 5/0407 137/247.39 |
| 1,693,977 A * | 12/1928 | Egan | ............... | E03F 5/046 210/163 |
| 1,746,121 A * | 2/1930 | Levy | ............... | E03F 5/14 210/237 |
| 2,102,310 A * | 12/1937 | Egan | ............... | E03F 5/0404 210/247 |
| 2,182,795 A * | 12/1939 | Day | ............... | E03F 5/0404 210/434 |
| 2,414,487 A * | 1/1947 | Schuttler | ............... | B07B 1/50 210/474 |
| 2,473,279 A * | 6/1949 | Crocker | ............... | E03F 5/046 404/4 |
| RE23,205 E * | 3/1950 | Crocker | ............... | E03F 5/046 210/163 |
| 2,615,526 A * | 10/1952 | Lane | ............... | E03F 5/0404 188/153 R |
| 3,282,430 A * | 11/1966 | Kinne | ............... | A01G 25/00 210/162 |
| 3,587,239 A * | 6/1971 | Feland | ............... | E01F 5/005 405/125 |
| 3,838,706 A * | 10/1974 | Klenk | ............... | E03F 5/0407 137/433 |
| 4,261,823 A * | 4/1981 | Gallagher | ............... | E03F 5/101 210/164 |
| 4,415,462 A * | 11/1983 | Finch | ............... | E02B 5/08 210/162 |
| 4,419,232 A * | 12/1983 | Arntyr | ............... | E03F 5/0404 210/170.03 |
| 4,483,640 A * | 11/1984 | Berger | ............... | E02D 29/0208 210/170.03 |
| 4,594,157 A * | 6/1986 | McGowan | ............... | E03F 5/06 210/163 |
| 4,713,179 A * | 12/1987 | Goedderz, Sr. | ........... | E03F 7/06 210/162 |
| 4,838,732 A * | 6/1989 | Clark | ............... | E02D 29/14 405/303 |
| 4,988,234 A * | 1/1991 | Henkel | ............... | E03F 7/02 405/36 |
| 4,988,235 A * | 1/1991 | Hurley | ............... | E01C 13/02 405/36 |
| 5,032,264 A * | 7/1991 | Geiger | ............... | E03F 5/041 210/163 |
| 5,037,541 A * | 8/1991 | Ruey-Jang | ............... | E03F 5/06 210/155 |
| 5,037,542 A * | 8/1991 | Carroll | ............... | E01F 5/005 210/170.03 |
| 5,069,781 A * | 12/1991 | Wilkes | ............... | E03F 5/041 4/290 |
| 5,130,016 A * | 7/1992 | Gavin | ............... | E03F 5/06 210/164 |
| 5,133,619 A * | 7/1992 | Murfae | ............... | B01D 24/12 404/5 |
| 5,223,154 A * | 6/1993 | MacPherson, Jr. | .... | B01D 29/05 210/801 |
| 5,232,587 A * | 8/1993 | Hegemier | ............. | E03F 5/0404 210/170.03 |
| 5,264,134 A * | 11/1993 | McCamy | ........... | B01D 17/0214 210/747.2 |
| 5,284,580 A * | 2/1994 | Shyh | ............... | B01D 29/117 52/12 |
| 5,297,367 A * | 3/1994 | Sainz | ............... | E03F 5/16 52/12 |
| 5,297,895 A * | 3/1994 | Johnson | ............... | E02B 11/00 405/74 |
| 5,345,741 A * | 9/1994 | Slater | ............... | E03F 7/02 210/170.03 |
| 5,372,714 A * | 12/1994 | Logue, Jr. | ............. | E03F 5/0404 404/5 |
| 5,375,940 A * | 12/1994 | Kobayashi | ............... | E03F 5/06 404/5 |
| 5,397,464 A * | 3/1995 | Hannon | ............... | E03F 5/0404 210/473 |
| 5,403,474 A * | 4/1995 | Emery | ............... | E03F 5/046 210/474 |
| 5,405,539 A * | 4/1995 | Schneider | ............. | E03F 5/0404 210/170.03 |
| 5,422,000 A * | 6/1995 | Huber | ............... | B01D 29/035 210/162 |
| 5,480,254 A * | 1/1996 | Autry | ............... | E03F 5/0404 210/791 |
| 5,507,944 A * | 4/1996 | Friedland | ............... | E03F 5/14 210/162 |
| 5,511,904 A * | 4/1996 | Van Egmond | ......... | E03F 1/002 405/36 |
| 5,527,131 A * | 6/1996 | Salmond | ............... | E03F 7/02 405/303 |

(56) References Cited

U.S. PATENT DOCUMENTS

| | | | | |
|---|---|---|---|---|
| 5,562,819 A * | 10/1996 | Turner, Jr. | B01D 29/96 | 210/170.03 |
| 5,575,925 A * | 11/1996 | Logue, Jr. | E03F 5/0404 | 404/5 |
| 5,587,072 A * | 12/1996 | Regan | B01D 29/54 | 405/36 |
| 5,632,888 A * | 5/1997 | Chinn | E03F 5/0404 | 210/163 |
| 5,632,889 A * | 5/1997 | Tharp | E03F 5/16 | 210/170.03 |
| 5,636,871 A * | 6/1997 | Field | B65D 33/00 | 114/361 |
| 5,643,445 A * | 7/1997 | Billias | E03F 5/14 | 210/162 |
| 5,650,065 A * | 7/1997 | Sewell | E03F 5/16 | 52/12 |
| 5,674,386 A * | 10/1997 | Filion | E03F 5/12 | 210/162 |
| 5,679,246 A * | 10/1997 | Wilcox | E03F 7/02 | 210/170.03 |
| 5,702,595 A * | 12/1997 | Mossburg, Jr. | E03F 1/00 | 210/232 |
| 5,707,527 A * | 1/1998 | Knutson | C02F 1/28 | 210/170.03 |
| 5,725,782 A * | 3/1998 | Chinn | E03F 1/00 | 210/767 |
| 5,733,444 A * | 3/1998 | Johnson | E03F 5/0404 | 210/232 |
| 5,733,445 A * | 3/1998 | Fanelli | E03F 5/0404 | 210/489 |
| 5,744,048 A * | 4/1998 | Stetler | E03F 5/0401 | 210/232 |
| 5,769,566 A * | 6/1998 | Shea | E03F 5/02 | 210/166 |
| 5,772,882 A * | 6/1998 | Chang | B01D 35/04 | 52/16 |
| 5,788,848 A * | 8/1998 | Blanche | B01D 21/26 | 210/309 |
| 5,788,849 A * | 8/1998 | Hutter, Jr. | B01J 20/20 | 210/170.03 |
| 5,820,762 A * | 10/1998 | Bamer | E03F 5/0404 | 210/255 |
| 5,843,306 A * | 12/1998 | Singleton | B01D 29/15 | 210/170.03 |
| 5,849,181 A * | 12/1998 | Monteith | B01D 17/0208 | 210/170.03 |
| 5,849,198 A * | 12/1998 | Sharpless | C02F 1/285 | 210/247 |
| 5,855,774 A * | 1/1999 | Boelter | B01D 17/00 | 52/12 |
| 5,904,842 A * | 5/1999 | Billias | E03F 5/0401 | 210/162 |
| 5,925,241 A * | 7/1999 | Aldridge | B01J 20/20 | 96/147 |
| 5,954,952 A * | 9/1999 | Strawser, Sr. | E03F 1/00 | 210/489 |
| 5,958,226 A * | 9/1999 | Fleischmann | E03F 5/0404 | 210/489 |
| 5,980,740 A * | 11/1999 | Harms | E03F 5/14 | 210/170.03 |
| 5,985,157 A * | 11/1999 | Leckner | B01D 29/27 | 210/170.03 |
| 6,004,457 A * | 12/1999 | Singleton | E03F 5/0401 | 210/170.03 |
| 6,010,622 A * | 1/2000 | Chinn | E03F 5/06 | 210/489 |
| 6,015,489 A * | 1/2000 | Allen | E03F 5/06 | 210/131 |
| 6,017,166 A * | 1/2000 | Mossburg, Jr. | E03F 5/0404 | 404/5 |
| 6,059,964 A * | 5/2000 | Strawser, Sr. | E03F 5/0404 | 210/489 |
| 6,080,307 A * | 6/2000 | Morris | E03F 5/0404 | 210/283 |
| 6,086,758 A * | 7/2000 | Schilling | B01D 39/1623 | 210/485 |
| 6,093,314 A * | 7/2000 | Wilson | E03F 5/0404 | 137/247 |
| 6,099,723 A * | 8/2000 | Morris | E03F 1/00 | 210/170.03 |
| 6,106,706 A * | 8/2000 | Roy | E03F 1/00 | 210/136 |
| 6,106,707 A * | 8/2000 | Morris | E03F 1/00 | 210/337 |
| 6,135,293 A * | 10/2000 | Herbst | B01D 29/27 | 100/123 |
| 6,149,803 A * | 11/2000 | DiLoreto, Jr. | B01D 29/96 | 210/170.03 |
| 6,165,357 A * | 12/2000 | Cormier | E04D 13/0409 | 52/12 |
| 6,178,565 B1 * | 1/2001 | Franco | E03F 1/00 | 4/291 |
| 6,200,484 B1 * | 3/2001 | McInnis | E03F 5/0404 | 210/170.03 |
| 6,202,749 B1 * | 3/2001 | Adams | E21B 41/0021 | 166/227 |
| 6,214,216 B1 * | 4/2001 | Isaacson | E03F 1/00 | 210/162 |
| 6,217,756 B1 * | 4/2001 | Martinez | E03F 5/0404 | 210/163 |
| 6,217,757 B1 * | 4/2001 | Fleischmann | B01D 24/46 | 210/166 |
| 6,221,243 B1 * | 4/2001 | Flanagan | B01D 17/0202 | 210/170.03 |
| 6,231,758 B1 * | 5/2001 | Morris | E03F 5/046 | 210/337 |
| 6,241,881 B1 * | 6/2001 | Pezzaniti | B01D 21/267 | 210/170.03 |
| 6,254,770 B1 * | 7/2001 | Remon | E03F 5/0404 | 210/163 |
| 6,261,444 B1 * | 7/2001 | Forse | E03F 1/00 | 210/489 |
| 6,261,445 B1 * | 7/2001 | Singleton | E03F 5/04 | 210/170.03 |
| 6,270,663 B1 * | 8/2001 | Happel | B01D 35/22 | 210/170.03 |
| 6,274,036 B1 * | 8/2001 | Ellis | B01D 29/27 | 210/474 |
| 6,287,459 B1 * | 9/2001 | Williamson | E03F 5/16 | 210/259 |
| 6,294,095 B1 * | 9/2001 | Lewis | E03F 1/00 | 210/477 |
| 6,299,764 B1 * | 10/2001 | White | E03F 5/0406 | 210/164 |
| 6,306,293 B1 * | 10/2001 | Schilling | E03F 5/0404 | 210/485 |
| 6,334,953 B1 * | 1/2002 | Singleton | E03F 5/14 | 405/36 |
| 6,337,016 B1 * | 1/2002 | Alper | C02F 1/288 | 210/512.1 |
| 6,337,025 B1 * | 1/2002 | Clemenson | B01J 39/24 | 210/170.03 |
| 6,338,595 B1 * | 1/2002 | Schollen | E03F 5/14 | 210/170.03 |
| 6,368,499 B1 * | 4/2002 | Sharpless | E03F 5/0404 | 210/164 |
| 6,379,541 B1 * | 4/2002 | Nicholas | E03F 5/0404 | 210/170.03 |
| 6,402,942 B2 * | 6/2002 | Cardwell | E03F 5/0404 | 210/489 |
| D460,810 S * | 7/2002 | Sommerhein | D23/261 | |
| 6,416,674 B1 * | 7/2002 | Singleton | E03F 5/105 | 210/170.03 |
| 6,428,693 B2 * | 8/2002 | Singleton | E03F 5/0404 | 210/170.03 |
| D466,198 S * | 11/2002 | Mullings | D23/261 | |
| 6,485,639 B1 * | 11/2002 | Gannon | B01J 20/261 | 210/170.03 |

(56) References Cited

U.S. PATENT DOCUMENTS

| | | | | |
|---|---|---|---|---|
| 6,503,390 B1* | 1/2003 | Gannon | B01D 17/0202 | 210/170.03 |
| 6,511,595 B2* | 1/2003 | Crompton | B01D 21/26 | 210/309 |
| 6,517,709 B1* | 2/2003 | Cardwell | E03F 1/00 | 210/170.03 |
| 6,521,122 B1* | 2/2003 | Elliot | E03F 5/0404 | 210/170.03 |
| 6,524,473 B2* | 2/2003 | Williamson | E03F 5/14 | 210/170.03 |
| 6,530,722 B1* | 3/2003 | Shaw | E03F 1/00 | 4/293 |
| 6,531,059 B1* | 3/2003 | Morris | B01D 29/58 | 210/170.03 |
| 6,533,941 B2* | 3/2003 | Butler | E03F 5/0404 | 210/170.03 |
| 6,537,446 B1* | 3/2003 | Sanguinetti | E03F 5/0404 | 210/474 |
| 6,537,447 B2* | 3/2003 | Remon | E02D 29/12 | 210/163 |
| 6,551,023 B2* | 4/2003 | Allard | E03F 1/00 | 405/36 |
| 6,551,505 B2* | 4/2003 | Chinn | E03F 1/00 | 210/170.03 |
| 6,554,997 B1* | 4/2003 | Schilling | B01D 29/23 | 210/485 |
| 6,562,233 B1* | 5/2003 | Schilling | B01D 29/23 | 210/485 |
| 6,588,029 B2* | 7/2003 | Mullings | E04H 4/1236 | 4/286 |
| 6,602,408 B1* | 8/2003 | Berkey | B01D 35/027 | 210/477 |
| 6,609,852 B2* | 8/2003 | Wimberger | E03F 1/00 | 210/170.03 |
| 6,631,588 B1* | 10/2003 | Distler | E04D 13/0409 | 52/302.1 |
| 6,666,974 B2* | 12/2003 | Page | E03F 1/00 | 210/170.03 |
| 6,668,390 B1* | 12/2003 | Gonzalez | E03F 1/00 | 210/162 |
| 6,679,994 B1* | 1/2004 | Turco | E03F 5/12 | 210/791 |
| 6,705,049 B2* | 3/2004 | Esmond | E04D 13/08 | 210/162 |
| 6,706,172 B2* | 3/2004 | Strawser, Sr. | B01D 29/05 | 210/474 |
| 6,709,579 B1* | 3/2004 | Singleton | E03F 5/0404 | 210/474 |
| 6,712,976 B2* | 3/2004 | Manzone | B01J 20/3042 | 210/764 |
| 6,726,402 B1* | 4/2004 | Martinez | E03F 5/0404 | 405/36 |
| 6,733,665 B1* | 5/2004 | Khalil | B01D 21/0012 | 210/163 |
| 6,743,354 B1* | 6/2004 | Evans, Jr. | E03F 1/00 | 210/170.03 |
| 6,749,366 B1* | 6/2004 | Chinn | E03F 5/0404 | 405/40 |
| 6,749,746 B2* | 6/2004 | Mokrzycki | B01D 36/04 | 210/170.03 |
| 6,764,261 B1* | 7/2004 | Stadler | E02D 29/1427 | 411/340 |
| 6,767,456 B2* | 7/2004 | Middleton | B01J 20/28023 | 210/170.03 |
| 6,793,811 B1* | 9/2004 | Fleischmann | E03F 1/00 | 210/170.03 |
| 6,797,162 B2* | 9/2004 | Happel | E03F 1/00 | 210/163 |
| 6,805,804 B2* | 10/2004 | Page | B01D 17/0202 | 210/170.03 |
| 6,808,623 B2* | 10/2004 | Harris | E03F 1/00 | 210/170.03 |
| 6,811,708 B2* | 11/2004 | Shaw | E03F 1/00 | 210/162 |
| 6,821,053 B2* | 11/2004 | Martinez | E03F 5/046 | 405/36 |
| 6,824,677 B2* | 11/2004 | Martinez | E03F 1/00 | 210/170.03 |
| 6,841,077 B2* | 1/2005 | Gannon | B01D 15/00 | 210/170.03 |
| 6,843,616 B2* | 1/2005 | Sychra | E01F 7/02 | 210/170.03 |
| 6,869,523 B2* | 3/2005 | Martinez | E03F 5/046 | 210/163 |
| 6,869,525 B1* | 3/2005 | Happel | B01D 21/02 | 210/163 |
| 6,869,526 B2* | 3/2005 | Sharpless | C02F 1/285 | 210/170.03 |
| 6,872,029 B2* | 3/2005 | Allard | B01D 35/05 | 405/36 |
| 6,884,343 B2* | 4/2005 | Harris | B01D 29/014 | 210/163 |
| 6,905,599 B2* | 6/2005 | Allard | E03F 1/002 | 210/170.03 |
| 6,908,549 B2* | 6/2005 | Middleton | E03F 5/0401 | 210/232 |
| 6,922,953 B1* | 8/2005 | Lewis | E03F 1/00 | 211/175 |
| 6,953,524 B2* | 10/2005 | Woodbridge | E03F 5/12 | 210/162 |
| 6,972,088 B2* | 12/2005 | Yehuda | E03F 5/046 | 210/163 |
| 6,974,540 B1* | 12/2005 | Fleischmann | E03F 1/00 | 210/163 |
| 6,976,808 B2* | 12/2005 | Allard | E03F 1/00 | 405/36 |
| 6,986,621 B2* | 1/2006 | Allard | B01D 29/27 | 405/36 |
| 6,997,636 B2* | 2/2006 | Tremouilhac | E03F 5/046 | 404/5 |
| 6,998,039 B2* | 2/2006 | Harris | E03F 1/00 | 210/474 |
| 7,001,507 B2* | 2/2006 | Orozco | B01D 29/58 | 210/170.03 |
| 7,005,060 B2* | 2/2006 | Pitt | E03F 5/0404 | 210/170.03 |
| 7,005,061 B1* | 2/2006 | Downs | E03F 1/00 | 210/474 |
| 7,014,755 B2* | 3/2006 | Muir | C02F 1/285 | 210/283 |
| 7,040,838 B2* | 5/2006 | Allard | E03F 5/0401 | 405/36 |
| 7,052,207 B1* | 5/2006 | Wimberger | E03F 5/0401 | 210/170.03 |
| 7,066,685 B2* | 6/2006 | Humphries | E03F 5/06 | 210/163 |
| 7,070,691 B2* | 7/2006 | Lindemulder | E03F 1/00 | 210/474 |
| 7,074,326 B2* | 7/2006 | Singleton | E03F 5/0404 | 210/489 |
| 7,083,721 B2* | 8/2006 | McClure | E03F 1/00 | 210/162 |
| 7,094,338 B2* | 8/2006 | Morris | B01D 29/58 | 264/DIG. 48 |
| 7,105,086 B2* | 9/2006 | Saliba | E03F 5/0404 | 210/170.03 |
| 7,108,783 B2* | 9/2006 | Glazik | E03F 5/0404 | 210/170.03 |
| 7,112,274 B1* | 9/2006 | Sanguinetti | B01D 29/01 | 210/474 |
| 7,125,823 B2* | 10/2006 | Manzone | B01J 20/3246 | 502/402 |
| 7,128,495 B1* | 10/2006 | Lill | E03F 5/046 | 292/257 |
| 7,128,832 B2* | 10/2006 | Wade | E03B 3/02 | 210/162 |
| 7,132,045 B1* | 11/2006 | Trangsrud | E03F 5/0404 | 210/474 |

(56) References Cited

U.S. PATENT DOCUMENTS

| | | | | |
|---|---|---|---|---|
| 7,156,987 B1* | 1/2007 | Sanguinetti | E03F 1/00 | 210/474 |
| 7,160,048 B1* | 1/2007 | Fattori | E01C 11/227 | 404/2 |
| 7,163,635 B2* | 1/2007 | Fitzgerald | E03F 5/0404 | 210/170.03 |
| 7,178,675 B2* | 2/2007 | Votel | A47L 17/02 | 210/488 |
| 7,179,371 B1* | 2/2007 | Bistline | E03F 5/0404 | 210/473 |
| 7,186,333 B2* | 3/2007 | Kluge | E03F 1/00 | 210/691 |
| 7,201,843 B2* | 4/2007 | Sasaki | B01D 29/27 | 210/478 |
| 7,208,082 B2* | 4/2007 | Hurst | E03F 5/0404 | 210/691 |
| 7,229,559 B2* | 6/2007 | Manzone | B01J 20/3007 | 210/660 |
| 7,234,894 B1* | 6/2007 | Flury | E03F 5/046 | 405/94 |
| 7,238,279 B2* | 7/2007 | Saurenman | E03F 5/0404 | 210/163 |
| 7,246,968 B1* | 7/2007 | Priest | E03F 5/0404 | 404/5 |
| 7,258,785 B2* | 8/2007 | Weir | E03F 1/00 | 210/163 |
| 7,270,747 B2* | 9/2007 | Happel | E03F 5/12 | 210/162 |
| 7,294,256 B2* | 11/2007 | Happel | E03F 5/14 | 210/170.03 |
| 7,300,573 B1* | 11/2007 | Trangsrud | E03F 1/00 | 210/474 |
| 7,300,574 B1* | 11/2007 | Lewis | E03F 5/0404 | 210/473 |
| 7,300,590 B2* | 11/2007 | Weir | E03F 5/16 | 210/170.03 |
| 7,309,420 B1* | 12/2007 | Trangsrud | E03F 1/00 | 210/170.03 |
| 7,311,844 B1* | 12/2007 | Joyner | C02F 1/283 | 210/691 |
| 7,313,889 B2* | 1/2008 | Karow | E01C 11/222 | 52/103 |
| 7,332,091 B2* | 2/2008 | Peters, Jr. | E03F 1/00 | 210/691 |
| 7,357,861 B2* | 4/2008 | Kelley | E03F 5/0404 | 210/473 |
| 7,396,471 B2* | 7/2008 | Wimberger | E03F 5/0401 | 210/170.03 |
| 7,404,690 B2* | 7/2008 | Lukasik | E01C 5/18 | 404/34 |
| 7,404,892 B2* | 7/2008 | Shaw | E03F 5/0404 | 210/170.03 |
| 7,407,574 B2* | 8/2008 | Robinson | E04D 13/0767 | 52/12 |
| 7,438,802 B2* | 10/2008 | Hurst | E03F 5/0404 | 210/348 |
| 7,438,803 B1* | 10/2008 | Allen | B01D 21/0066 | 210/171 |
| 7,455,766 B1* | 11/2008 | Lewis | E03F 5/0404 | 210/473 |
| 7,465,391 B2* | 12/2008 | Heist | B01D 29/03 | 210/791 |
| 7,479,221 B2* | 1/2009 | Paoluccio | E03F 1/00 | 210/163 |
| 7,481,921 B2* | 1/2009 | Kent | E03F 1/00 | 210/170.03 |
| 7,485,218 B2* | 2/2009 | Dussich | E03F 1/00 | 210/255 |
| 7,488,414 B2* | 2/2009 | Wimberger | E03F 5/0401 | 210/170.03 |
| 7,491,338 B2* | 2/2009 | Nino | E03F 1/00 | 210/791 |
| 7,494,585 B2* | 2/2009 | Nino | E03F 1/00 | 210/767 |
| 7,524,414 B1* | 4/2009 | Barragan | E03F 5/0404 | 210/170.03 |
| 7,540,953 B2* | 6/2009 | Fitzgerald | C02F 1/004 | 210/170.03 |
| 7,549,820 B1* | 6/2009 | Happel | E03F 1/00 | 210/163 |
| 7,563,364 B2* | 7/2009 | Shaw | B01D 35/301 | 210/163 |
| D598,196 S* | 8/2009 | Vreeland | D3/304 | |
| D600,324 S* | 9/2009 | Vreeland | D23/261 | |
| 7,588,689 B2* | 9/2009 | Paoluccio | E03F 1/00 | 210/660 |
| 7,611,304 B2* | 11/2009 | Lill | E02D 29/1427 | 210/163 |
| 7,658,857 B2* | 2/2010 | Wacome | E03F 5/0404 | 210/170.03 |
| 7,670,483 B2* | 3/2010 | Ringenbach | E03F 1/00 | 210/474 |
| 7,682,104 B2* | 3/2010 | Wassman | E01F 5/005 | 210/170.03 |
| 7,699,978 B2* | 4/2010 | Dyer | E03F 5/0404 | 210/163 |
| 7,771,591 B2* | 8/2010 | Lucas | E03F 5/0404 | 210/489 |
| 7,780,372 B2* | 8/2010 | Fattori | E01C 11/223 | 404/2 |
| 7,799,235 B2* | 9/2010 | Olson | B01D 29/96 | 210/232 |
| 7,837,869 B2* | 11/2010 | Peters, Jr. | E03F 5/0404 | 210/170.03 |
| 7,854,838 B2* | 12/2010 | Martin | E02B 5/085 | 210/170.03 |
| 7,875,178 B2* | 1/2011 | Ashliman | B01D 24/007 | 210/477 |
| 7,879,233 B2* | 2/2011 | Shaw | E03F 5/0404 | 210/164 |
| 7,914,229 B2* | 3/2011 | Aubusson | E03F 5/06 | 4/510 |
| 7,922,916 B1* | 4/2011 | Witt | E03F 1/00 | 210/170.03 |
| 7,951,291 B2* | 5/2011 | Nino | E03F 1/00 | 210/162 |
| 7,959,799 B2* | 6/2011 | Happel | B01D 21/0012 | 210/166 |
| 7,981,283 B2* | 7/2011 | Happel | E03F 5/14 | 210/162 |
| 7,981,300 B2* | 7/2011 | Wacome | E03F 5/0401 | 210/170.03 |
| 7,985,335 B2* | 7/2011 | Allard | E03F 5/0404 | 210/170.03 |
| 7,988,870 B2* | 8/2011 | Belasco | E03F 5/0404 | 210/170.03 |
| 8,002,977 B2* | 8/2011 | Shaw | E03F 5/0404 | 210/232 |
| 8,012,346 B2* | 9/2011 | Peters, Jr. | E03F 5/0404 | 210/170.03 |
| 8,017,005 B2* | 9/2011 | Ringenbach | E03F 5/0404 | 210/473 |
| 8,017,006 B2* | 9/2011 | Lopez | E03F 1/00 | 210/170.03 |
| 8,034,237 B2* | 10/2011 | Happel | E03F 5/12 | 210/170.03 |
| 8,043,498 B2* | 10/2011 | Rueda | E03F 5/0404 | 210/348 |
| 8,051,568 B2* | 11/2011 | Moody | E03F 5/0404 | 210/691 |
| 8,110,099 B2* | 2/2012 | Hersey | B01D 35/147 | 210/170.03 |
| 8,123,935 B2* | 2/2012 | Murray | B01D 29/66 | 210/170.03 |
| 8,137,564 B2* | 3/2012 | Gannon | B01J 20/26 | 210/259 |
| 8,158,010 B2* | 4/2012 | Pearse | E03F 5/125 | 210/799 |

(56) References Cited

U.S. PATENT DOCUMENTS

| | | | |
|---|---|---|---|
| 8,168,064 B2* | 5/2012 | Peters, Jr. | E03F 5/06 210/170.03 |
| 8,216,453 B2* | 7/2012 | Moody | E03F 5/0404 210/232 |
| 8,216,479 B2* | 7/2012 | Lambert, V | E03F 1/002 210/170.03 |
| 8,221,618 B2* | 7/2012 | Murray | B01D 29/72 210/411 |
| 8,221,632 B2* | 7/2012 | McInnis | E03F 5/0404 210/170.03 |
| 8,226,824 B2* | 7/2012 | Mondschein | E03F 5/0404 210/163 |
| 8,235,624 B2* | 8/2012 | Lill | E03F 5/046 210/163 |
| 8,287,726 B2* | 10/2012 | Williams | B01D 35/10 210/170.03 |
| 8,323,485 B2* | 12/2012 | Blundell | E03F 1/002 210/170.03 |
| 8,343,357 B2* | 1/2013 | Horner | E03F 1/00 210/170.03 |
| 8,366,923 B1* | 2/2013 | Happel | E03F 5/14 210/170.03 |
| 8,388,835 B2* | 3/2013 | Haschke | E03F 5/0404 210/170.03 |
| 8,438,731 B2* | 5/2013 | Peters, Jr. | E03F 5/06 210/170.03 |
| 8,475,655 B2* | 7/2013 | Sasaki | E03F 5/14 210/170.03 |
| 8,486,260 B2* | 7/2013 | Tripodi | E03F 5/14 210/232 |
| 8,491,797 B1* | 7/2013 | Happel | E03F 5/14 210/170.03 |
| 8,496,405 B1* | 7/2013 | Kincheloe | E03F 5/0404 405/125 |
| 8,501,016 B2* | 8/2013 | Lord | E03F 5/14 210/170.03 |
| 8,535,523 B2* | 9/2013 | Friezner | E03F 5/0404 210/170.03 |
| 8,557,108 B2* | 10/2013 | Rennels | E03C 1/264 210/163 |
| 8,557,109 B1* | 10/2013 | Sutherland | E03F 5/0404 210/163 |
| 8,591,729 B2* | 11/2013 | Alqanee | E03F 5/0405 210/170.03 |
| 8,602,681 B1* | 12/2013 | Masser | E03F 1/005 405/43 |
| 8,608,956 B2* | 12/2013 | Moulton | E03F 5/0404 210/473 |
| 8,623,203 B2* | 1/2014 | Peters, Jr. | E03F 5/14 210/170.03 |
| 8,652,323 B2* | 2/2014 | Dorsey | E03F 1/00 210/164 |
| 8,679,328 B2* | 3/2014 | Hebert | E03F 5/0404 210/163 |
| 8,679,329 B2* | 3/2014 | Vreeland | B01D 23/04 210/170.03 |
| 8,715,491 B2* | 5/2014 | Shaw | E03F 5/041 210/85 |
| 8,734,053 B1* | 5/2014 | Sackett | E01F 5/005 405/74 |
| 8,813,788 B2* | 8/2014 | Tyner | B01D 17/0208 210/170.03 |
| 8,834,714 B2* | 9/2014 | Chien | E03F 5/0404 210/166 |
| 8,906,232 B2* | 12/2014 | McInnis | E03F 5/14 210/170.03 |
| 8,940,160 B2* | 1/2015 | Lill | E03F 5/06 210/170.03 |
| 8,945,375 B2* | 2/2015 | Friezner | E03F 5/0404 210/170.03 |
| 8,974,665 B2* | 3/2015 | Vreeland | E03F 5/14 210/170.03 |
| 8,980,084 B2* | 3/2015 | Dorsey | E03F 5/14 210/163 |
| D726,886 S* | 4/2015 | Sutherland | D23/261 |
| 9,017,550 B2* | 4/2015 | Mitchell | E03F 5/0404 210/170.03 |
| 9,051,192 B2* | 6/2015 | Kent | E03F 5/041 |
| 9,057,189 B2* | 6/2015 | Flury | E03F 5/046 |
| 9,127,448 B2* | 9/2015 | Thomas | E03F 5/125 |
| 9,149,743 B2* | 10/2015 | Conwell | B01D 29/114 |
| 9,175,465 B2* | 11/2015 | Rinkenback | E03F 5/0407 |
| 9,194,116 B2* | 11/2015 | Bailey | E03F 5/0404 |
| 9,206,593 B2* | 12/2015 | Tripodi | E03F 5/0407 |
| 9,267,252 B1* | 2/2016 | Adler | E02D 29/14 |
| 9,279,242 B2* | 3/2016 | Alvarado | E03F 5/06 |
| 9,296,021 B2* | 3/2016 | Moulton | B08B 17/025 |
| 9,340,965 B2* | 5/2016 | Happel | E03F 5/125 |
| 9,428,899 B2* | 8/2016 | Friezner | E03F 5/0404 |
| 9,506,233 B2* | 11/2016 | Allard | E03F 5/0401 |
| 9,512,606 B2* | 12/2016 | Allard | C02F 3/327 |
| 9,512,608 B2* | 12/2016 | Al-Assfour | E03F 5/0404 |
| 9,540,799 B2* | 1/2017 | Allard | E03F 5/101 |
| 9,573,086 B2* | 2/2017 | Corder | E03F 5/06 |
| 9,598,850 B2* | 3/2017 | Liston | E03F 5/0404 |
| 9,611,626 B2* | 4/2017 | Pettey | E02D 29/0208 |
| 9,624,658 B2* | 4/2017 | Hannah | E03F 5/0404 |
| 9,695,584 B2* | 7/2017 | Moran | B01D 21/0045 |
| 9,719,240 B1* | 8/2017 | Montague | E03F 5/041 |
| 9,752,315 B1* | 9/2017 | Phillips | E03F 5/0411 |
| 9,903,105 B2* | 2/2018 | Tomberlin | E03F 5/0411 |
| 9,963,865 B2* | 5/2018 | Groff | E03F 5/0404 |
| 9,976,294 B1* | 5/2018 | Flury | E03F 5/0411 |
| 9,982,418 B2* | 5/2018 | Bennett | E03B 7/095 |
| 10,053,382 B2* | 8/2018 | Wilkie | C02F 1/004 |
| 10,087,586 B2* | 10/2018 | Murphy, III | C02F 1/285 |
| 10,094,099 B1* | 10/2018 | Flury | E03F 5/0411 |
| 10,113,303 B2* | 10/2018 | Mardian | E03F 5/06 |
| 10,131,773 B2* | 11/2018 | Welle, IV | C08L 17/00 |
| 10,155,670 B1* | 12/2018 | Happel | E03F 5/0404 |
| 10,167,620 B2* | 1/2019 | Zock | C02F 1/004 |
| 10,202,285 B1* | 2/2019 | Happel | C02F 1/001 |
| 10,208,884 B2* | 2/2019 | Honeyball | E01C 13/083 |
| 10,238,993 B1* | 3/2019 | Happel | B01D 29/56 |
| 10,294,651 B2* | 5/2019 | Dannrup | B01D 35/143 |
| 10,323,401 B2* | 6/2019 | Wilkie | B01D 35/02 |
| 10,334,839 B2* | 7/2019 | Deurloo | E03F 5/042 |
| 10,384,155 B1* | 8/2019 | DiLalla | E03F 5/0404 |
| 10,384,956 B1* | 8/2019 | Happel | B01D 21/2472 |
| 10,407,891 B1* | 9/2019 | Sanguinetti | E03F 5/0404 |
| 10,415,226 B2* | 9/2019 | Lacouture | E03F 5/0404 |
| 10,422,119 B2* | 9/2019 | Coppola | E03F 5/0404 |
| 10,465,371 B2* | 11/2019 | Wacome | E03F 5/106 |
| 10,508,430 B2* | 12/2019 | Riley | B01D 29/27 |
| 10,570,604 B2* | 2/2020 | McInnis | E03F 5/0404 |
| 10,597,862 B1* | 3/2020 | Downare | C02F 1/001 |
| 10,626,592 B2* | 4/2020 | Dubois | B01D 29/21 |
| 10,648,165 B1* | 5/2020 | Friezner | G01N 1/18 |
| 10,655,330 B2* | 5/2020 | Keshet | E03F 1/00 |
| 10,662,637 B2* | 5/2020 | Moran | B01D 21/0039 |
| 10,683,655 B2* | 6/2020 | Peters, Jr. | B01D 29/23 |
| 10,704,247 B2* | 7/2020 | Zock | E02B 3/106 |
| 10,724,224 B2* | 7/2020 | Deurloo | B01D 29/27 |
| 10,753,077 B2* | 8/2020 | Coppola | E03F 5/16 |
| 10,786,765 B2* | 9/2020 | DiLalla | B01D 29/27 |
| 10,844,588 B1* | 11/2020 | Riley | E03F 5/0404 |
| 10,918,975 B1* | 2/2021 | Happel | B01D 21/2433 |
| 10,961,714 B2* | 3/2021 | Herrero-Smith | E04D 13/0404 |
| 10,995,483 B1* | 5/2021 | Sanguinetti | E03F 5/0404 |
| 10,995,484 B2* | 5/2021 | Friezner | G01N 1/12 |
| 11,008,748 B1* | 5/2021 | Hodge, Jr. | E03F 5/06 |
| 11,096,386 B2* | 8/2021 | Deurloo | E03F 5/042 |
| 11,098,472 B2* | 8/2021 | Zock | B01D 39/1676 |
| 11,124,958 B2* | 9/2021 | Gagliardi | E03F 5/0403 |
| 11,186,980 B2* | 11/2021 | Yeoman | E03F 5/0404 |
| 11,198,998 B1* | 12/2021 | Zung | E03F 1/001 |
| 11,253,798 B2* | 2/2022 | Happel | B01D 24/4631 |
| 2001/0023842 A1* | 9/2001 | Singleton | E03F 5/0404 210/170.03 |
| 2001/0030150 A1* | 10/2001 | Remon | E03F 1/00 210/163 |

(56) References Cited

U.S. PATENT DOCUMENTS

| | | | | |
|---|---|---|---|---|
| 2001/0047955 A1* | 12/2001 | Chinn | E03F 5/06 | 210/164 |
| 2002/0014445 A1* | 2/2002 | Cardwell | E03F 5/0404 | 210/163 |
| 2002/0020658 A1* | 2/2002 | Isaacson | E03F 5/0404 | 210/162 |
| 2002/0048490 A1* | 4/2002 | Allard | B01D 35/05 | 210/170.03 |
| 2002/0057944 A1* | 5/2002 | Adams | B01D 17/0208 | 405/39 |
| 2002/0071722 A1* | 6/2002 | Allard | E03F 5/0404 | 405/40 |
| 2002/0090267 A1* | 7/2002 | Wimberger | E03F 5/0404 | 405/36 |
| 2002/0096461 A1* | 7/2002 | Harris | E03F 1/00 | 210/162 |
| 2002/0104789 A1* | 8/2002 | Harris | E03F 1/00 | 210/162 |
| 2002/0113025 A1* | 8/2002 | Gauldin | E03F 5/0401 | 210/767 |
| 2002/0121466 A1* | 9/2002 | McDermott | B01D 17/0202 | 210/164 |
| 2002/0130070 A1* | 9/2002 | Roesner | E03F 5/0404 | 210/163 |
| 2002/0130083 A1* | 9/2002 | Middleton | B01J 20/26 | 210/162 |
| 2002/0159838 A1* | 10/2002 | Allard | E03F 5/0404 | 405/43 |
| 2002/0164209 A1* | 11/2002 | Allard | E03F 1/00 | 405/36 |
| 2003/0034286 A1* | 2/2003 | Butler | E03F 5/0404 | 210/163 |
| 2003/0047497 A1* | 3/2003 | Harris | E03F 1/00 | 210/170.03 |
| 2003/0047514 A1* | 3/2003 | Manzone | B01D 39/04 | 210/170.03 |
| 2003/0053862 A1* | 3/2003 | Shaw | E03F 1/00 | 405/40 |
| 2003/0098267 A1* | 5/2003 | Page | E03F 5/0404 | 210/164 |
| 2003/0127380 A1* | 7/2003 | Morris | B01D 29/05 | 210/164 |
| 2003/0132150 A1* | 7/2003 | Happel | E03F 1/00 | 210/163 |
| 2003/0141230 A1* | 7/2003 | Mokrzycki | E03F 5/16 | 210/163 |
| 2003/0147693 A1* | 8/2003 | Knak | E03F 5/06 | 404/4 |
| 2003/0173277 A1* | 9/2003 | Shaw | E03F 5/0404 | 210/163 |
| 2003/0183569 A1* | 10/2003 | Hannah | E03F 5/14 | 210/236 |
| 2003/0217955 A1* | 11/2003 | Strawser, Sr. | E03F 5/0404 | 210/163 |
| 2004/0007522 A1* | 1/2004 | Garti | B01D 29/27 | 210/167.16 |
| 2004/0011731 A1* | 1/2004 | Sanguinetti | E03F 5/0404 | 210/483 |
| 2004/0016692 A1* | 1/2004 | Sasaki | B01D 29/27 | 210/473 |
| 2004/0035772 A1* | 2/2004 | McGinn | E03F 1/00 | 210/163 |
| 2004/0040901 A1* | 3/2004 | Page | B01D 17/10 | 210/163 |
| 2004/0047687 A1* | 3/2004 | Sychra | E01F 7/02 | 405/32 |
| 2004/0065601 A1* | 4/2004 | Martinez | E03F 1/00 | 210/162 |
| 2004/0067102 A1* | 4/2004 | Martinez | E03F 1/00 | 52/211 |
| 2004/0069697 A1* | 4/2004 | Martinez | E03F 1/00 | 210/163 |
| 2004/0094461 A1* | 5/2004 | Sharpless | C02F 1/285 | 210/163 |
| 2004/0099586 A1* | 5/2004 | Imoto | E03F 5/08 | 210/85 |
| 2004/0112811 A1* | 6/2004 | Lindemulder | E03F 1/00 | 210/163 |
| 2004/0128903 A1* | 7/2004 | Wexler | A01M 29/34 | 43/122 |
| 2004/0173513 A1* | 9/2004 | Nino | E03F 5/125 | 210/163 |
| 2004/0188357 A1* | 9/2004 | Moore | E03F 5/14 | 210/163 |
| 2004/0200767 A1* | 10/2004 | Singleton | E03F 1/00 | 210/163 |
| 2004/0222159 A1* | 11/2004 | Peters, Jr. | B01J 39/14 | 210/170.03 |
| 2004/0226869 A1* | 11/2004 | McClure | E03F 5/0404 | 210/163 |
| 2004/0232057 A1* | 11/2004 | Orozco | B01D 29/15 | 210/86 |
| 2005/0000872 A1* | 1/2005 | Middleton | C02F 1/285 | 210/163 |
| 2005/0051467 A1* | 3/2005 | Yehuda | E03F 5/046 | 210/163 |
| 2005/0051499 A1* | 3/2005 | Nino | E03F 5/0404 | 210/163 |
| 2005/0067338 A1* | 3/2005 | Page | E03F 5/0404 | 210/164 |
| 2005/0072738 A1* | 4/2005 | Weir | E03F 5/16 | 210/163 |
| 2005/0103694 A1* | 5/2005 | Rost | E03F 5/0404 | 210/164 |
| 2005/0163568 A1* | 7/2005 | Sanguinetti | E02D 17/20 | 405/20 |
| 2005/0183997 A1* | 8/2005 | Happel | E03F 5/0404 | 210/163 |
| 2005/0199537 A1* | 9/2005 | Kluge | E03F 5/0404 | 210/164 |
| 2005/0218049 A1* | 10/2005 | Happel | E03F 5/0404 | 210/163 |
| 2005/0230302 A1* | 10/2005 | Muir | C02F 1/285 | 210/290 |
| 2005/0230317 A1* | 10/2005 | Belasco | E03F 5/0404 | 210/163 |
| 2005/0247612 A1* | 11/2005 | Glassheim | E03F 5/0404 | 210/163 |
| 2006/0049085 A1* | 3/2006 | Parker | E03F 5/0404 | 210/163 |
| 2006/0054562 A1* | 3/2006 | Peters, Jr. | B01J 39/14 | 210/170.03 |
| 2006/0091049 A1* | 5/2006 | Hurst | E03F 5/0404 | 210/163 |
| 2006/0102543 A1* | 5/2006 | Peters, Jr. | E03F 1/00 | 210/170.03 |
| 2006/0124519 A1* | 6/2006 | Glazik | E03F 1/00 | 405/36 |
| 2006/0124520 A1* | 6/2006 | Hurst | E03F 5/0404 | 210/163 |
| 2006/0127182 A1* | 6/2006 | Sanguinetti | E03F 1/00 | 405/20 |
| 2006/0163130 A1* | 7/2006 | Happel | E03F 5/14 | 210/163 |
| 2006/0201860 A1* | 9/2006 | Happel | E03F 5/12 | 210/162 |
| 2006/0207922 A1* | 9/2006 | Dussich | E03F 5/0404 | 210/164 |
| 2006/0231508 A1* | 10/2006 | Marzett | B01D 21/0006 | 210/806 |
| 2006/0231509 A1* | 10/2006 | Marzett | B01D 21/0006 | 210/791 |
| 2007/0009327 A1* | 1/2007 | Sanguinetti | E02B 3/04 | 405/115 |
| 2007/0012606 A1* | 1/2007 | Shaw | E03F 1/00 | 210/163 |
| 2007/0045162 A1* | 3/2007 | Hurst | E03F 1/00 | 210/163 |

(56) References Cited

U.S. PATENT DOCUMENTS

| | | | |
|---|---|---|---|
| 2007/0086856 A1* | 4/2007 | Lill | E03F 5/046 404/4 |
| 2007/0090033 A1* | 4/2007 | K. Kelley | E03F 1/00 210/163 |
| 2007/0131597 A1* | 6/2007 | Chen | E03F 5/06 210/164 |
| 2007/0138074 A1* | 6/2007 | Howard | E03F 1/00 210/163 |
| 2007/0181486 A1* | 8/2007 | Ashliman | B01D 29/54 210/485 |
| 2007/0187310 A1* | 8/2007 | Weir | E03F 1/00 210/163 |
| 2007/0199869 A1* | 8/2007 | Al-Assfour | E03F 5/0404 210/164 |
| 2007/0205144 A1* | 9/2007 | Robinson | E04D 13/0767 210/163 |
| 2007/0295652 A1* | 12/2007 | Kent | E03F 1/00 210/164 |
| 2008/0006568 A1* | 1/2008 | Moody | E03F 5/0404 210/163 |
| 2008/0014021 A1* | 1/2008 | Flury | E03F 5/046 405/94 |
| 2008/0023382 A1* | 1/2008 | Longo | E03F 5/0404 210/164 |
| 2008/0023408 A1* | 1/2008 | Hansen | B01D 21/01 210/170.03 |
| 2008/0047886 A1* | 2/2008 | Lambert | E03F 1/002 210/170.03 |
| 2008/0073277 A1* | 3/2008 | Paoluccio | E03F 5/0404 210/163 |
| 2008/0093280 A1* | 4/2008 | Kang | E03F 5/0404 210/163 |
| 2008/0105603 A1* | 5/2008 | Hurst | E03F 1/00 210/163 |
| 2008/0145150 A1* | 6/2008 | Shaw | E03F 1/00 405/36 |
| 2008/0149544 A1* | 6/2008 | Shaw | E03F 1/00 210/163 |
| 2008/0179229 A1* | 7/2008 | Dorsey | E03F 1/00 210/163 |
| 2008/0210607 A1* | 9/2008 | Owen | E03C 1/26 210/138 |
| 2008/0226390 A1* | 9/2008 | Nino | E03F 5/046 404/5 |
| 2008/0251470 A1* | 10/2008 | Kent | E03F 1/00 210/170.03 |
| 2008/0260465 A1* | 10/2008 | Hurst | E03F 1/00 405/87 |
| 2008/0277335 A1* | 11/2008 | Allen | B01D 21/0003 210/521 |
| 2008/0290042 A1* | 11/2008 | Hanson | E03F 5/0404 210/170.03 |
| 2008/0296211 A1* | 12/2008 | Swan | E03F 5/0404 210/163 |
| 2008/0308477 A1* | 12/2008 | Hurst | B01D 21/0006 210/163 |
| 2009/0014370 A1* | 1/2009 | Peters, Jr. | E03F 5/0404 210/164 |
| 2009/0014371 A1* | 1/2009 | Cook | E03F 5/0404 210/170.03 |
| 2009/0045145 A1* | 2/2009 | Kent | B01D 39/2089 210/170.03 |
| 2009/0095682 A1* | 4/2009 | Paoluccio | E03F 5/0404 210/660 |
| 2009/0101553 A1* | 4/2009 | Lucas | E03F 5/0404 210/164 |
| 2009/0101591 A1* | 4/2009 | Lewis | E03F 5/0404 210/163 |
| 2009/0107899 A1* | 4/2009 | Ringenbach | E03F 1/00 210/164 |
| 2009/0114579 A1* | 5/2009 | Dyer | E03F 5/046 210/162 |
| 2009/0166279 A1* | 7/2009 | Happel | E03F 5/16 210/170.03 |
| 2009/0173699 A1* | 7/2009 | Wacome | E03F 5/0404 210/170.03 |
| 2009/0236293 A1* | 9/2009 | Alvarado | E03F 5/0404 210/163 |
| 2009/0250405 A1* | 10/2009 | Allard | E03F 1/00 210/162 |
| 2010/0006487 A1* | 1/2010 | Belasco | E03F 11/00 405/52 |
| 2010/0025312 A1* | 2/2010 | Martin | E02B 5/085 210/170.03 |
| 2010/0108839 A1* | 5/2010 | Ringenbach | E03F 1/00 248/225.11 |
| 2010/0133201 A1* | 6/2010 | Wacome | E03F 5/0404 210/170.03 |
| 2010/0200483 A1* | 8/2010 | Giehl | E02B 8/026 210/170.03 |
| 2010/0258490 A1* | 10/2010 | Haschke | E03F 5/0404 210/166 |
| 2010/0269929 A1* | 10/2010 | Dodds | E02B 9/06 137/544 |
| 2010/0288684 A1* | 11/2010 | Lopez | E03F 1/00 210/163 |
| 2011/0049027 A1* | 3/2011 | Rueda | E03F 5/0404 210/163 |
| 2011/0100886 A1* | 5/2011 | Lill | E03F 5/046 210/164 |
| 2011/0120923 A1* | 5/2011 | Shaw | E03F 1/00 210/163 |
| 2011/0139694 A1* | 6/2011 | Mondschein | E03F 5/0404 210/163 |
| 2011/0155672 A1* | 6/2011 | McInnis | E03F 5/04 210/166 |
| 2011/0192775 A1* | 8/2011 | Shaw | E03F 5/041 210/170.03 |
| 2011/0253641 A1* | 10/2011 | Pearse | E03F 5/125 210/232 |
| 2011/0278237 A1* | 11/2011 | McInnis | E03F 5/14 210/163 |
| 2011/0290967 A1* | 12/2011 | Ringenbach | E03F 5/0404 248/224.8 |
| 2012/0043266 A1* | 2/2012 | Moody | E03F 5/0404 210/163 |
| 2012/0074048 A1* | 3/2012 | Glassheim | E03F 1/00 210/165 |
| 2012/0097617 A1* | 4/2012 | Blundell | E03F 5/0404 210/170.03 |
| 2012/0145612 A1* | 6/2012 | McInnis | E03F 5/0404 210/163 |
| 2012/0217205 A1* | 8/2012 | Lord | E03F 5/0403 210/170.03 |
| 2012/0222995 A1* | 9/2012 | Sasaki | E03F 5/14 210/170.03 |
| 2012/0222996 A1* | 9/2012 | Rennels | E03C 1/264 210/163 |
| 2012/0267319 A1* | 10/2012 | Peters, Jr. | B01D 29/902 210/170.03 |
| 2013/0008851 A1* | 1/2013 | Jarvis, Jr. | E03F 5/0404 210/499 |
| 2013/0020242 A1* | 1/2013 | Vreeland | E03F 5/0404 210/163 |
| 2013/0056399 A1* | 3/2013 | Downare | E03F 5/0404 210/170.03 |
| 2013/0087492 A1* | 4/2013 | Lea | B01D 29/27 210/241 |
| 2013/0092632 A1* | 4/2013 | Allard | E03F 1/002 210/170.03 |
| 2013/0118963 A1* | 5/2013 | Bailey | E03F 5/0404 137/15.01 |
| 2013/0126406 A1* | 5/2013 | Alqanee | B01D 35/02 210/163 |
| 2013/0186811 A1* | 7/2013 | Kaiser | E03F 5/0404 210/163 |
| 2013/0228527 A1* | 9/2013 | Crasti | C02F 1/004 210/170.03 |

(56) References Cited

U.S. PATENT DOCUMENTS

| | | | |
|---|---|---|---|
| 2013/0264256 A1* | 10/2013 | Hebert | E03F 5/0404 210/163 |
| 2013/0292311 A1* | 11/2013 | Shaw | E03F 5/042 137/15.01 |
| 2013/0292317 A1* | 11/2013 | Shaw | E03F 5/0404 210/283 |
| 2013/0299402 A1* | 11/2013 | Rogahn | E03F 5/0404 210/163 |
| 2013/0299435 A1* | 11/2013 | Coffman | E03F 1/001 210/170.03 |
| 2013/0313205 A1* | 11/2013 | Lord | E03F 5/10 210/163 |
| 2014/0027362 A1* | 1/2014 | Kent | E03F 5/0404 210/170.03 |
| 2014/0054236 A1* | 2/2014 | Bennett | E03B 7/095 210/170.03 |
| 2014/0124422 A1* | 5/2014 | Dorsey | E03F 5/06 210/163 |
| 2014/0158593 A1* | 6/2014 | Chien | E03F 1/00 210/166 |
| 2014/0224238 A1* | 8/2014 | Moulton | B08B 3/02 126/299 E |
| 2014/0238915 A1* | 8/2014 | McInnis | E03F 5/0404 210/170.03 |
| 2014/0246379 A1* | 9/2014 | McInnis | E03F 5/0404 210/747.3 |
| 2014/0263004 A1* | 9/2014 | Liston | E03F 5/0404 210/170.03 |
| 2014/0332452 A1* | 11/2014 | Wacome | E03F 5/0404 210/170.03 |
| 2014/0367328 A1* | 12/2014 | Allard | E03F 5/0401 210/747.2 |
| 2014/0374332 A1* | 12/2014 | Hannah | A01G 9/026 210/170.03 |
| 2015/0354242 A1* | 12/2015 | Saccoccio | B01D 29/50 210/806 |
| 2016/0256804 A1* | 9/2016 | Medeiros | A47J 43/24 |
| 2016/0289947 A1* | 10/2016 | Al-Assfour | E03F 5/0404 |
| 2017/0121957 A1* | 5/2017 | Brasberger | E03F 5/06 |
| 2017/0130889 A1* | 5/2017 | Honeyball | E01C 13/083 |
| 2017/0136392 A1* | 5/2017 | Perry | B01D 29/58 |
| 2017/0145677 A1* | 5/2017 | Coppola | E03F 5/16 |
| 2017/0241123 A1* | 8/2017 | Dannrup | B01J 20/261 |
| 2017/0284077 A1* | 10/2017 | Deurloo | B01D 29/96 |
| 2017/0314223 A1* | 11/2017 | Keshet | E03F 1/00 |
| 2018/0023280 A1* | 1/2018 | Hannah | E03F 5/0404 210/170.03 |
| 2018/0023281 A1* | 1/2018 | Coppola | C02F 1/001 210/163 |
| 2018/0023282 A1* | 1/2018 | Coppola | B01D 35/02 210/163 |
| 2018/0112386 A1* | 4/2018 | Coppola | E03F 5/16 |
| 2019/0153719 A1* | 5/2019 | McInnis | E03F 5/0403 |
| 2019/0177962 A1* | 6/2019 | Montague | E03F 5/041 |
| 2019/0186117 A1* | 6/2019 | Lacouture | E03F 5/0406 |
| 2019/0203457 A1* | 7/2019 | Peters, Jr. | E03F 5/106 |
| 2019/0226193 A1* | 7/2019 | Deurloo | B01D 29/27 |
| 2019/0292766 A1* | 9/2019 | Riley | E03F 5/16 |
| 2019/0357521 A1* | 11/2019 | Duerloo | B01D 29/94 |
| 2019/0358564 A1* | 11/2019 | DiLalla | E03F 5/0404 |
| 2019/0390451 A1* | 12/2019 | King | E03F 1/001 |
| 2020/0087909 A1* | 3/2020 | Kamand | B01D 29/35 |
| 2020/0316496 A1* | 10/2020 | Happel | B01D 24/36 |
| 2020/0370290 A1* | 11/2020 | Yeoman | E03F 5/16 |
| 2021/0087804 A1* | 3/2021 | Kent | E03F 5/0404 |
| 2021/0095459 A1* | 4/2021 | Deurloo | E03F 5/042 |
| 2021/0332581 A1* | 10/2021 | Lee | G06Q 50/02 |
| 2022/0023778 A1* | 1/2022 | Zarraonandia | B01D 29/58 |

FOREIGN PATENT DOCUMENTS

| | | | |
|---|---|---|---|
| CN | 201194964 | 2/2009 | |
| CN | 203594097 | 5/2014 | |
| CN | 105178387 | 12/2015 | |
| CN | 104863247 | 2/2017 | |
| CN | 206273911 | 6/2017 | |
| CN | 106978846 | 7/2017 | |
| CN | 110959057 | 11/2021 | |
| EP | 3828354 A1 * | 6/2021 | B01D 35/02 |
| EP | 3828354 A4 * | 7/2021 | B01D 35/02 |
| KR | 20090083884 | 8/2009 | |
| KR | 10-2009-0107245 | 10/2009 | |
| KR | 10-0920689 | 10/2009 | |
| KR | 10-2011-0054421 | 5/2011 | |
| KR | 10-2017-0000981 | 1/2017 | |
| KR | 10-1721439 | 3/2017 | |
| KR | 10-2017-0079458 | 7/2017 | |
| KR | 10-2017-0127677 | 11/2017 | |
| KR | 10-1794124 | 11/2017 | |
| WO | WO-2007004793 A1 * | 1/2007 | B65F 1/00 |
| WO | WO-2012036569 A1 * | 3/2012 | A01G 9/026 |
| WO | WO-2017172337 A1 * | 10/2017 | A01M 23/08 |
| WO | WO-2020022587 A1 * | 1/2020 | B01D 35/02 |

OTHER PUBLICATIONS

SIPO, Office Action of Application No. 201880003916.9 dated Jul. 30, 2020.
KIPO, International Search Report of Application No. PCT/KR2018/015367 dated Apr. 11, 2019.
SIPO, Office Action of CN 201880003916.9 dated Mar. 19, 2021.
EPO, Search Report of EP 18927666.0 dated Jun. 17, 2021.

* cited by examiner

STORM DRAIN FILTERS

TECHNICAL FIELD

The present invention relates to a rainwater runoff contaminant filtration apparatus installed in a rainwater drain, and a monitoring system therefor.

BACKGROUND ART

In general, contaminants may be classified into a point pollution source having a clear discharge point and a non-point pollution source having an unclear discharge point. The point pollution source may be discharged in a state in which it is purified to some extent because a separate purification device or a wastewater treatment facility is installed at the discharge point. On the other hand, the non-point pollution source may have the unclear discharge point and remain on a wide range of ground surface, and be then introduced into water systems such as streams and rivers together with rainwater to cause water pollution.

Examples of the non-point pollution source include agricultural lands, pastures, urban streets, forest lands, and suburb areas, and potential non-point contaminants existing mainly on a surface of soil or near the ground surface are washed away by the rainwater and are included in a runoff to be introduced into the water system. The non-point contaminants, which are contaminants mainly discharged together with a ground surface runoff at the time of initial rainfall, refer to traffic contaminants such as dust and garbage in urban areas, fertilizers and pesticides sprayed on the agricultural lands, soil erosion products, livestock house effluents, residues of living organisms, air contaminants that have fallen to the ground surface, and the like.

In order to prevent water pollution of streams or rivers due to the contaminants included in initial rainwater, non-point contaminant filtration apparatuss have been provided.

However, because most of the non-point contaminant filtration apparatuss are installed under the ground surface, it is difficult to monitor and manage how many foreign materials such as various garbage or earthy materials are introduced into and processed in street inlets, concrete rainwater runoff waterways, drainage ways of road slopes, or the like, and it is not possible to prevent deterioration of a filtering function as a non-point pollutant processing device or damage to facilities.

RELATED ART DOCUMENT

Patent Document (Patent Document 1) Korean Patent No. 0718719 (registered on May 9, 2007)
(Patent Document 2) Korean Patent Laid-Open Publication No. 2015-0045187 (published on Apr. 28, 2015)

DISCLOSURE

Technical Problem

The present invention has been made in an effort to solve the problem described above, and provides a rainwater runoff contaminant filtration apparatus installed in a rainwater drain such as a street inlet, a collecting well, or a drainage way of a road to be simply installed and removed, having a function of filtering a non-point pollutant, and capable of monitoring an operation state of a facility such as whether rainwater runoff is introduced or discharged and a collected amount of filtered contaminants by wireless communication.

The present invention provides a rainwater runoff contaminant filtration apparatus capable of grasping a weight increase of the rainwater runoff contaminant filtration apparatus at the lowest standby power state and transmitting the weight increase to the outside by installing a piezoelectric vibration sensor in a monitoring equipment to determine activation of the monitoring equipment and installing a contactless sensor and a magnet in a waterproof and dust-proof spring cylinder to operate as a switch.

Further, the present invention provides a monitoring system of a rainwater runoff contaminant filtration apparatus, including a control device capable of receiving information from the rainwater runoff contaminant filtration apparatus and determining whether or not the rainwater runoff contaminant filtration apparatus needs to be cleaned or whether a filter needs to be replaced.

Objects of the present invention are not limited to the objects mentioned above, and other objects that are not mentioned may be obviously understood by those skilled in the art from the following description.

Technical Solution

According to an aspect of the present invention, a rainwater runoff contaminant filtration apparatus includes: a body in which rainwater runoff is introduced into an opening whose top end is opened and the rainwater runoff is discharged to outlets formed on one or more side surfaces of a lower portion thereof (a street inlet, a collecting well, or a drainage way apparatus previously installed on a road may be reused as the body); a filtering unit located inside the body and filtering the rainwater runoff introduced into the opening; a collecting unit connected to the filtering unit, collecting the rainwater runoff, and providing the collected rainwater runoff to an inner portion of the filtering unit; a connection sensing unit including a spring cylinder to connect the filtering unit and the collecting unit to each other and sensing a weight of the filtering unit step by step on the basis of reciprocation of the spring cylinder; and a communication unit transmitting the weight of the filtering unit sensed by the connection sensing unit to the outside, wherein the connection sensing unit includes a contactless sensor located at an outer portion of the spring cylinder and a magnet located at an inner portion of the spring cylinder and moving in accordance with movement of the spring cylinder.

In addition, the communication unit may transmit a signal generated by the contactless sensor sensing the magnet to the outside, and the connection sensing unit may be activated through a signal generated by a piezoelectric vibration sensor sensing vibrations generated at the time of introduction of the rainwater runoff to measure whether or not a magnetic force of the magnet is detected by the contactless sensor or it may be measured whether or not the magnetic force of the magnet is detected according to a predefined period and such an electrical signal may be transmitted to the outside as a weight measuring result value through the contactless sensor.

In addition, the connection sensing unit may include a pressure sensor measuring a pressure of the spring cylinder connecting the collecting unit and the connection sensing unit to each other or a weight sensor measuring extension or compression according to sag of a filter strainer of the filtering unit, in addition to the contactless sensor sensing the magnetic force, and may measure a collection state of the contaminants of the filtering unit regardless of whether or not the rainwater runoff is introduced through a preset periodic observation plan and transmit a result value.

In addition, the body may have a ledge which extends inward of the opening and on which the collecting unit, the filtering unit, the communication unit, and the like, may be installed, allow the collecting unit, the filtering unit, and the communication unit to be mounted in an existing street inlet, and be formed to be variable according to a size of a roadside drain facility such as the street inlet or a collecting well.

In addition, the filtering unit may have an opened an upper surface, have a plurality of filtering holes formed in each of side surfaces and a lower surface thereof and having a predetermined size, and include a strainer having a filtering function or a filter strainer into which a filter bag may be inserted.

In addition, the collecting unit may have a shape in which a cross-sectional diameter gradually decreases from the top to the bottom.

In addition, the rainwater runoff contaminant filtration apparatus may include one or more pre-treating units formed on one or more side surfaces thereof.

In addition, the pre-treating unit may precipitate coarse adulterations of the rainwater runoff before providing the collected rainwater runoff to an inner portion of the filtering unit.

In addition, the collecting unit may be entirely fixed to the ledge, may be fixed in a hinge form to a compression rod supported on the body to be connected to the body, may be connected to the pre-treating unit by forming a hook ring, or may be connected to the pre-treating unit using a bolt, a nut and the like.

In addition, the connection sensing unit may be connected to the filtering unit and the collecting unit, respectively, by connection rings, and include a piezoelectric vibration sensor to observe vibrations due to a flow of the rainwater runoff introduced into the collecting unit or the pre-treating unit as an electrical signal to activate the connection sensing unit and the communication unit.

In addition, the connection sensing unit may include a piezoelectric vibration sensor to observe vibrations due to a flow of the rainwater runoff introduced into the collecting unit or the pre-treating unit as an electrical signal to activate the connection sensing unit and the communication unit.

In addition, the connection sensing unit may have one or more contactless sensors located at an outer portion of the spring cylinder, the contactless sensor being switched to an operation state by an electrical signal generated by the piezoelectric vibration sensor or starting measurement according to a predetermined period planned in advance.

In addition, the contactless sensor may be replaced by a weight sensor or a pressure sensor. In this case, connection configurations of the collecting unit and the filtering unit may be hooked onto the compression rod with a connection ring or be connected to the compression rod by a hinge.

According to another aspect of the present invention, a monitoring system of a rainwater runoff contaminant filtration apparatus includes: the rainwater runoff contaminant filtration apparatus including: a body in which rainwater runoff is introduced into an opening whose top end is opened and the rainwater runoff is discharged to outlets formed on one or more side surface of a lower portion thereof; a filtering unit installed inside the body and filtering the rainwater runoff introduced into the opening; a collecting unit connected to the filtering unit, collecting the rainwater runoff, precipitating the rainwater runoff in a pre-treating unit, and providing the rainwater runoff to an inner portion of the filtering unit; a connection sensing unit including a spring cylinder to connect the filtering unit and the collecting unit to each other, including a piezoelectric vibration sensor to activate the connection sensing unit and a communication unit, and sensing a weight of the filtering unit on the basis of reciprocation of the spring cylinder; and the communication unit transmitting the weight of the filtering unit sensed by the connection sensing unit to the outside, the connection sensing unit including a piezoelectric vibration sensor and a contactless sensor located at an outer portion of the spring cylinder and a magnet and a pressure sensor or a weight sensor located at an inner portion of the spring cylinder and moving in accordance with movement of the spring cylinder, and the communication unit being activated by an electrical signal from the piezoelectric vibration sensor of the connection sensing unit, performing arithmetic processing on a signal generated by the contactless sensor sensing the magnet according to a predefined period in itself, and then the signal to the outside; and a remote control device determining whether or not the rainwater runoff contaminant filtration apparatus is normally operated or whether or not to clean the rainwater runoff contaminant filtration apparatus on the basis of the weight information transmitted from the communication unit of the rainwater runoff contaminant filtration apparatus.

Detailed contents of other exemplary embodiments of the present invention are described in a detailed description and are illustrated in the accompanying drawings.

Advantageous Effects

According to the present invention, a filter or the like may be applied in a variable size to the rainwater runoff contaminant filtration apparatus, and the rainwater runoff contaminant filtration apparatus may be easily installed in and removed from a drainage way, a street inlet, a collecting wall, and the like, of a road or a complex.

In addition, the contactless sensor and the magnet are installed or the pressure sensor or the weight sensor is installed and operated in the piezoelectric vibration sensor and the spring cylinder that have a waterproof and dust-proof function, such that even though coarse adulterations introduced into the rainwater runoff contaminant filtration apparatus are caught between the weight sensor and the strainer, between the spring cylinder and the contactless sensor, or the like, the rainwater runoff contaminant filtration apparatus may be normally operated. In addition, even in an underground space in which a power line supplying external constant power may not be led or a self-power generation device may not be included, such as an inner portion of a drain facility such as a street inlet, a change in a weight of the filtering unit of the rainwater runoff contaminant filtration apparatus may be grasped and transmitted to the outside, and standby power at the time of non-rainfall may be minimized.

In addition, since it is possible to receive information from the rainwater runoff contaminant filtration apparatus and determine whether or not the rainwater runoff contaminant filtration apparatus needs to be cleaned, whether or not the filter needs to be replaced, or the like, the rainwater runoff contaminant filtration apparatus may be efficiently managed to contribute to prevention of flood and inundation accidents and protection of a water quality environment.

BEST MODE FOR INVENTION

Figure 1:
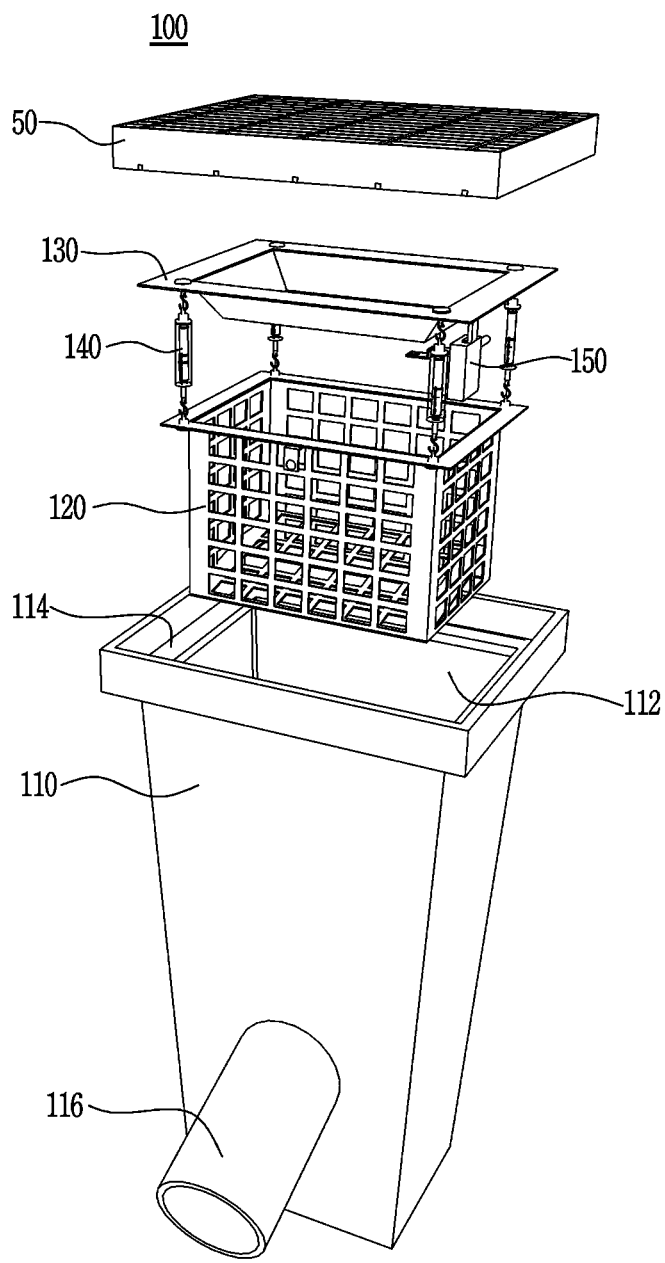
FIG. 1 is an exploded view of a rainwater runoff filtration apparatus according to an exemplary embodiment of the present invention.

Hereinafter, exemplary embodiments of the present invention will be described in detail with reference to the accompanying drawings. Various advantages and features of the present invention and methods accomplishing them will become apparent from the following detailed description of exemplary embodiments with reference to the accompanying drawings. However, the present invention is not limited to exemplary embodiments to be described below, but may be implemented in various different forms, these exemplary embodiments will be provided only in order to make the present invention complete and allow those skilled in the art to completely recognize the scope of the present invention, and the present invention will be defined by the scope of the claims. Throughout the specification, like reference numerals denote like elements.

Terms "first", "second" and the like are used to describe various elements, components, and/or sections, but these elements, components, and/or sections are not limited by these terms. These terms are used only in order to distinguish one element, component, or section from another element, component or section. Therefore, a first element, a first component, or a first section mentioned below may be a second element, a second component, or a second section within the technical spirit of the present invention.

Terms used in the present specification are for describing exemplary embodiments rather than limiting the present invention. In the present specification, a singular form includes a plural form unless explicitly stated otherwise. Components, steps, operations, and/or elements mentioned by the terms "comprise" and/or "made of" used in the present specification do not exclude the existence or addition of one or more other components, steps, operations, and/or elements.

Unless defined otherwise, all terms (including technical and scientific terms) used in the present specification have the same meaning as meanings commonly understood by those skilled in the art to which the present invention pertains. In addition, terms defined in generally used dictionaries are not ideally or excessively interpreted unless they are specifically defined clearly.

Hereinafter, the present disclosure will be described in detail with reference to the accompanying drawings.

Figure 2:
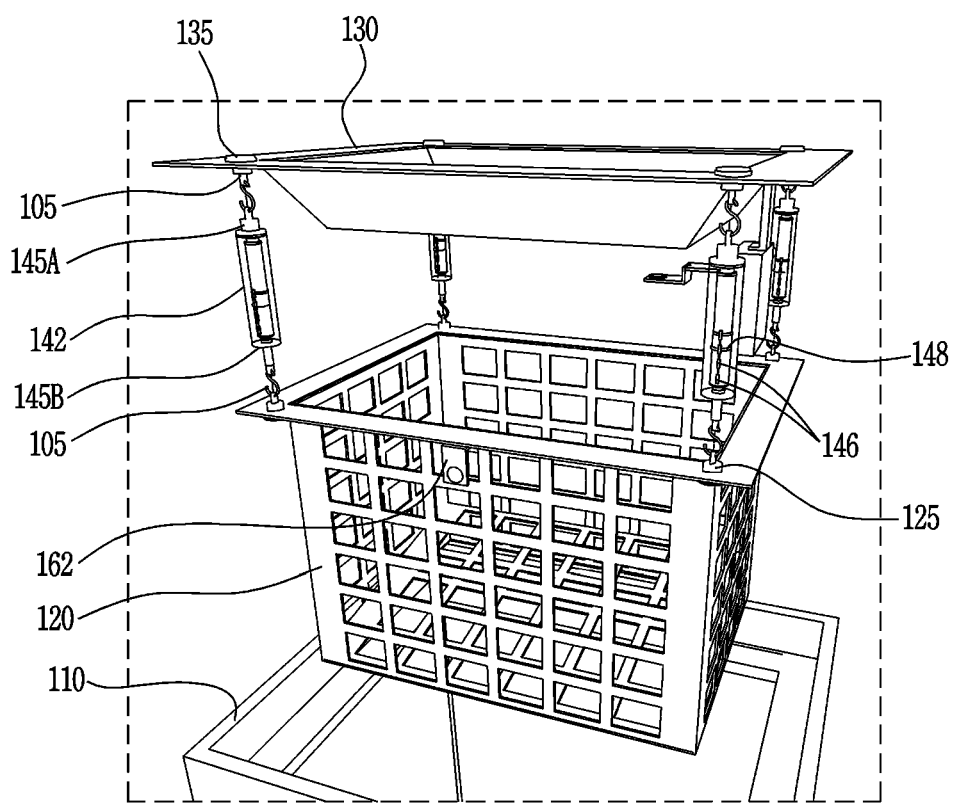
FIG. 2 is an enlarged view of a filtering unit, a collecting unit, and a connection sensing unit in the rainwater runoff contaminant filtration apparatus of FIG. 1.

FIG. 1 is an exploded view of a rainwater runoff contaminant filtration apparatus according to an exemplary embodiment of the present invention. In addition, FIG. 2 is an enlarged view of a filtering unit, a collecting unit, and a connection sensing unit in the rainwater runoff contaminant filtration apparatus of FIG. 1.

Referring to FIG. 1, the rainwater runoff contaminant filtration apparatus 100 according to an exemplary embodiment of the present invention includes a body 110 in which rainwater runoff is introduced into an opening 112 whose top end is opened and the rainwater runoff is discharged to an outlet 116 formed on one side surface of a lower portion thereof, a filtering unit 120 located inside the body 110 and filtering the rainwater runoff introduced into the opening 112, a collecting unit 130 connected to the filtering unit 120, collecting the rainwater runoff, and providing the collected rainwater runoff to an inner portion of the filtering unit 120, a connection sensing unit 140 including a spring cylinder 142 to connect the filtering unit 120 and the collecting unit 130 to each other and sensing a weight of the filtering unit 120 on the basis of reciprocation of the spring cylinder 142, and a communication unit 150 transmitting the weight of the filtering unit 120 sensed by the connection sensing unit 140 to the outside.

The rainwater runoff contaminant filtration apparatus 100 may be vertically installed below a grating 50 of a roadside street inlet to remove contaminants introduced at the time of rainfall. In a case where the rainwater runoff contaminant filtration apparatus 100 is vertically installed, the filtering unit 120 may be changed to be applicable in a variable size, and filtration is performed by the filtering unit 120 itself in which a plurality of holes are formed. In addition, the grating 50 of the existing street inlet may be mounted with the collecting unit 130 easily collecting the rainwater runoff, and a filter strainer (not illustrated) serving as a filter or a filter strainer mounted with a filter may be mounted at a lower end of the collecting unit 130.

In addition, the rainwater runoff contaminant filtration apparatus 100 may transmit an alarm through the communication unit 150 on the basis of a signal from the connection sensing unit 140 when a weight of the filtering unit 120 increases due to accumulation of contaminants.

In this case, the connection sensing unit 140 may include one or more contactless sensors 146 located at an outer portion of the spring cylinder 142 and a magnet 148 located at an inner portion of the spring cylinder 142 and moving in accordance with movement of the spring cylinder 142.

Therefore, the contactless sensors 146 may be installed on the waterproof and dust-proof spring cylinder 142 to operate as switches, and may confirm an increase in a weight of the filtering unit 120 of the rainwater runoff contaminant filtration apparatus 100.

The spring cylinder 142 is installed in order to secure durability and sense a predetermined weight or more of the filtering unit 120 in an environment requiring waterproof and dustproof, and in a case where a magnetic force is sensed by the contactless sensor 146 of the outer portion of the cylinder 142 by installing the magnet 148 at the inner portion of the spring cylinder 142, a signal is notified at the corresponding position. Standby power of the communication unit 150 at the time of non-rainfall may be minimized by using one or more contactless sensors and the magnet 148 as described above.

In addition, the communication unit 150 may transmit the signal generated by the contactless sensor 146 sensing the magnet 148 to the outside. Specifically, in a case where the rainwater runoff is introduced from the top and an impact is applied to the filtering unit 120, a flow pressure applied to a plurality of spring cylinders 142 temporarily increases or decreases and sensing ranges of the contactless sensors 146 are changed due to a reaction force of the spring cylinders 142, and a signal according to such an increase or decrease may thus be transmitted to the outside through the communication unit 150.

Hereinafter, the rainwater runoff contaminant filtration apparatus 100 according to an exemplary embodiment of the present invention will be described in detail.

Figure 3:
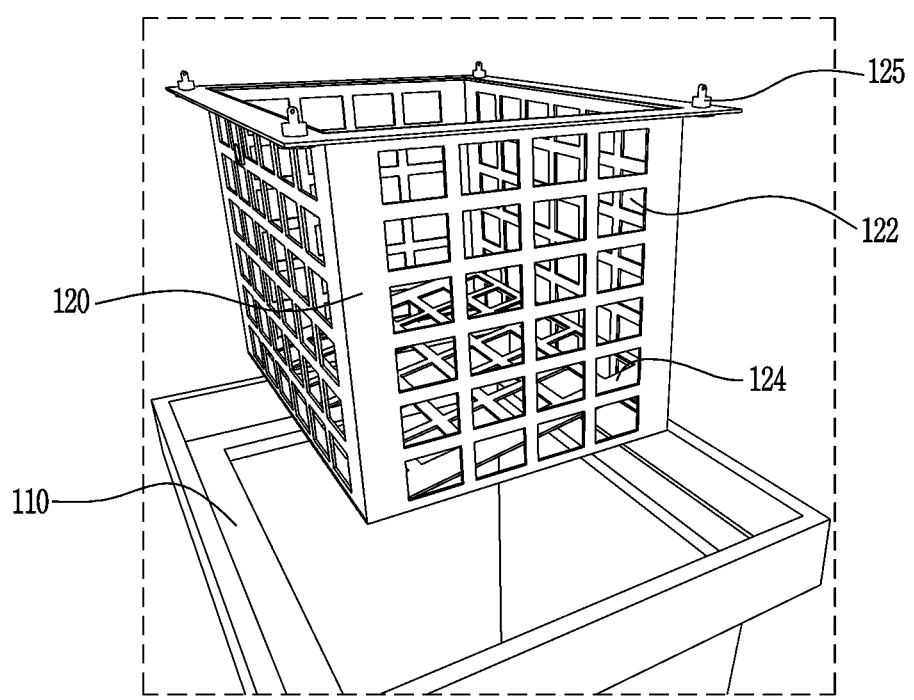
FIG. 3 is an enlarged view of the filtering unit in the rainwater runoff contaminant filtration apparatus of FIG. 1.
Figure 4:
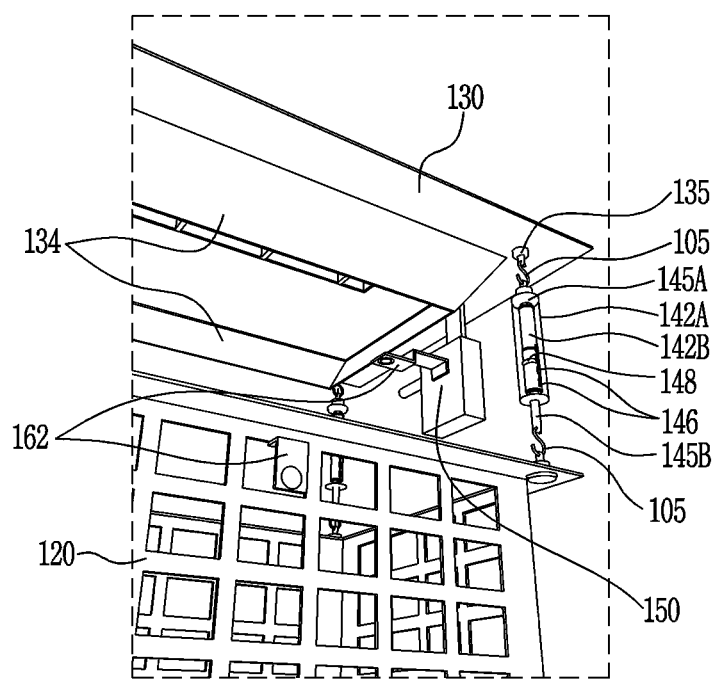
FIG. 4 is an enlarged view of the connection sensing unit and a communication unit in the rainwater runoff contaminant filtration apparatus of FIG. 1.
Figure 5:
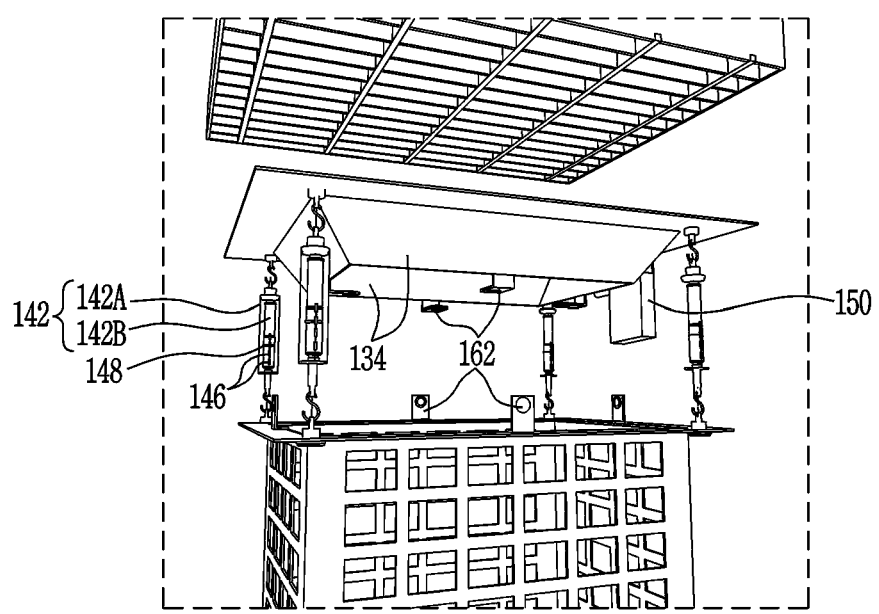
FIG. 5 is a view illustrating an installation position of a piezoelectric vibration sensor in the rainwater runoff contaminant filtration apparatus of FIG. 1.
Figure 6:
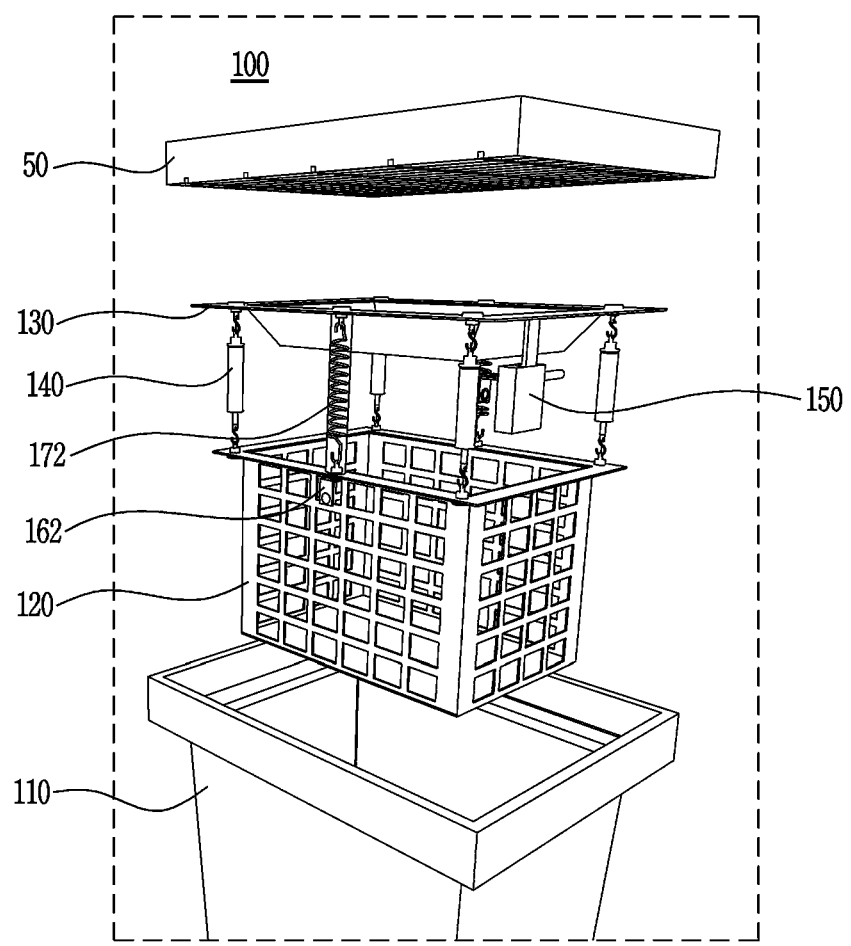
FIG. 6 is a view illustrating an installation position of a connection member in the rainwater runoff contaminant filtration apparatus of FIG. 1.
Figure 7:
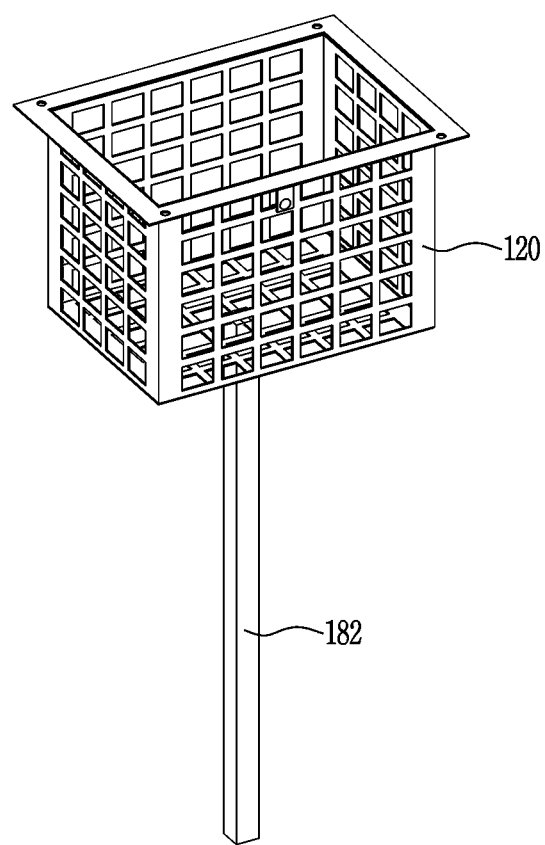
FIG. 7 is a view illustrating an installation position of a support member in the rainwater runoff contaminant filtration apparatus of FIG. 1.

FIG. 3 is an enlarged view of the filtering unit in the rainwater runoff contaminant filtration apparatus of FIG. 1. In addition, FIG. 4 is an enlarged view of the connection sensing unit and a communication unit in the rainwater runoff contaminant filtration apparatus of FIG. 1. Further, FIG. 5 is a view illustrating an installation position of a piezoelectric vibration sensor in the rainwater runoff contaminant filtration apparatus of FIG. 1. Further, FIG. 6 is a view illustrating an installation position of a connection member in the rainwater runoff contaminant filtration apparatus of FIG. 1, and FIG. 7 is a view illustrating an installation position of a support member in the rainwater runoff contaminant filtration apparatus of FIG. 1.

Again referring to FIGS. 1 and 2, the body 110 includes the opening 112 whose top end is opened and the outlet 116 formed on one side surface of the lower portion thereof. It is preferable that a cross-sectional area of the body 110 decreases from the top to the bottom so that the rainwater runoff introduced into the opening 112 is collected and discharged to the outlet 116.

In addition, the body 110 may have a ledge 114 which extends inward of the opening 112 and on which the collecting unit 130, the filtering unit 120, the communication unit 150, and the like, may be installed.

In addition, the body 110 may allow the collecting unit 130, the filtering unit 120, the communication unit 150, and the like, to be mounted in the existing street inlet (not illustrated), and may be formed to be variable according to a size of a roadside drain facility such as the street inlet or a collecting well.

In addition, although not illustrated in the drawings, the body 110 may also reuse the street inlet, the collecting well, and a drainage way filtration device previously installed in the road.

Referring to FIGS. 1 to 5, the filtering unit 120 serves to filter the rainwater runoff, and is located inside the body 110. Specifically, the filtering unit 120 may be connected to the collecting unit 130 by the connection sensing unit 140 and be located in an internal empty space of the body 110. The filtering unit 120 may have an opened upper surface and have a plurality of filtering holes 122 formed in each of side surfaces and a lower surface thereof and having a predetermined size, in order to perform a filtering function in itself. In this case, although not illustrated in the drawings, the filtering unit 120 may include a strainer having a filtering function or a filter strainer into which a filter bag may be inserted. Alternatively, the filtering unit 120 is not used, and the filtering unit 120 may be replaced by a strainer itself. In a case where the filtering unit 120 is not used, the strainer may be installed to be directly connected to the collecting unit 130.

In addition, the filtering unit 120 may include a lower surface member 124 having an inclined structure. The lower surface member 124 has the inclined structure to collect contaminants deposited on the filtering unit 120, the strainer (not illustrated) or the like in one direction and allow the rainwater runoff to pass in the other direction, such that the rainwater runoff may quickly pass through the filtering unit 120.

The collecting unit 130 collects the rainwater runoff and allows the rainwater runoff to flow into the filtering unit 120. The collecting unit 130 is connected to the filtering unit 120 by the connection sensing unit 140, and may be installed across the ledge 114 by a protruding portion formed on an upper portion thereof.

Here, the strainer (not illustrated) collecting the contaminants therein may be fixed by inserting one end of the strainer between a portion at which the body 110 and the collecting unit 130 are in contact with each other. Specifically, the strainer may be inserted between the ledge 114 and the protruding portion of the upper portion of the collecting unit 130 to be fixed in a state in which an inlet of the strainer is opened. Therefore, the rainwater runoff water is introduced into the strainer, such that only the contaminants may be strained by the strainer and the rainwater runoff may be filtered and then discharged to the outlet 116 of the body 110.

The collecting unit 130 preferably has a shape in which a cross-sectional diameter gradually decreases from the top to the bottom so that the rainwater runoff water easily flows into the filtering unit 120 or the strainer. For example, as illustrated in FIGS. 4 and 5, the collecting unit 130 may have slopes 134 extending diagonally from the top of the collecting unit 130.

The connection sensing unit 140 includes the spring cylinder 142 to connect the filtering unit 120 and the collecting unit 130 to each other. Therefore, the filtering unit 120 may be suspended from the collecting unit 130 by the connection sensing unit 140.

Specifically, the connection sensing unit 140 may be connected to the filtering unit 120 and the collecting unit 130, respectively, by connection rings 105. Because the collecting unit 130 is located above the connection sensing unit 140 and the filtering unit 120 is located below the connection sensing unit 140, one of the connection rings 105 may be located at the collecting unit 130 and the other of the connection rings 105 may be located at the connection sensing unit 140, but the connection rings are not limited thereto.

For example, as illustrated in FIGS. 2, 4 and 5, the collecting unit 130 may be provided with a collecting unit fixing member 135 to which the connection ring 105 is fixed, and one end of the spring cylinder 142 may be provided with a sensing unit fastening member 145A in which a fastening groove is formed. The connection ring 105 fixed to the collecting unit fixing member 135 is fastened to the fastening groove of the sensing unit fastening member 145A. In addition, the other end of the spring cylinder 142 may be provided with a sensing unit fixing member 145B to which the connection ring 105 is fixed, and the filtering unit 120 may be provided with a filtering unit fastening member 125 in which a fastening groove is formed. The connection ring 105 fixed to the sensing unit fixing member 145B is fastened to the fastening groove of the filtering unit fastening member 125.

Here, a connection member 172 may be added in order to strengthen a connected force when the filtering unit 120 and the collecting unit 130 are connected to each other by the connection sensing unit 140. As illustrated in FIG. 6, one end and the other end of the connection member 172 may be connected to the filtering unit 120 and the collecting unit 130, respectively, and a plurality of the connection members 172 may be installed at appropriate positions.

In addition, a support member 182 may be added, in addition to the connection member 172. As illustrated in FIG. 7, the support member 182 may be installed below the filtering unit 120 so as to support the filtering unit 120. Only one support member 182 has illustrated at the center of a lower surface of the filtering unit 120 in FIG. 7, but a plurality of support members 182 may be installed below the filtering unit 120. Even in a case where the filtering unit 120 cannot endure a weight increase due to introduction of the rainwater runoff in a flood period or the like, such that the filtering unit 120 falls inside the street inlet, it is possible to prevent a drain hole of a bottom end of the street inlet from being blocked, due to the support member 182 of the filtering unit 120.

In addition, the connection sensing unit 140 may include a plurality of contactless sensors 146 located at an outer portion of the spring cylinder 142 and a magnet 148 located at an inner portion of the spring cylinder 142 and moving in accordance with movement of the spring cylinder 142. One or more such contactless sensors 146 may be located at an outer portion of the spring cylinder 142.

Here, the spring cylinder 142 is installed in order to secure durability and sense a predetermined weight or more of the filtering unit 120 in an environment requiring waterproof and dustproof. The magnet 148 is installed in an inner cylinder 142B of the spring cylinder 142, and the plurality of contactless sensors 146 are installed in an outer housing 142A of the spring cylinder 142. When a magnetic force is sensed by one of the plurality of contactless sensors 146, a sensing signal is generated by the contactless sensor 146 that has sensed the magnetic force. Such a sending signal may be transmitted to the outside through the communication unit 150.

The weight of the filtering unit 120 may be determined according to a position of the contactless sensor 146 at which the signal is sensed. In this case, because the contactless sensors 146 operate according to a position of the magnet 148 moving in accordance with the movement of the spring cylinder 142, the weight of the filtering unit 120 may be sensed step by step on the basis of the reciprocation of the spring cylinder 142. For example, as illustrated in FIGS. 2, 4, and 5, in a case where four contactless sensors 146 are installed, when a signal is sensed by the uppermost contactless sensor 146, a weight inside the filtering unit 120 may be determined to be 5 kg. In addition, when a signal is sensed by the next contactless sensor 146, a weight inside the filtering unit 120 may be determined to be 10 kg. In addition, when a signal is sensed by the next contactless sensor 146, a weight inside the filtering unit 120 may be determined to be 15 kg. Further, when a signal is sensed by a final contactless sensor 146, a weight inside the filtering unit 120 may be determined to be 20 kg. These are exemplary numeral values, and sensed weight ranges may be set differently according to a size or the like of the filtering unit 120.

In this case, a flow pressure applied to the spring cylinder 142 temporarily increases or decreases, and sensing ranges of the contactless sensors 146 are changed due to a reaction force of the spring cylinder 142. Therefore, in a case where such an increase or decrease continues for a predetermined time or longer, it may be determined that the rainwater runoff is being introduced.

Together with such rainfall identification, if the weight of the filtering unit 120 decreases due to drying of the filtering unit 120 after rainfall ends (for example, 12 hours), owing to water drain, or the like, such that additional filtration is possible, it is preferable to allow the communication unit 150 of the rainwater runoff contaminant filtration apparatus 100 to enter a communication standby state in preparation for the next rainfall. Through this, standby power at the time of non-rainfall may be minimized.

In a case where a preset reference weight value is continuously sensed for a predetermined time in one or more spring cylinders 142 after the rainfall ends, a warning signal such as an inspection of the rainwater runoff contaminant filtration apparatus 100 and/or a contaminant collection request may be transmitted to the outside through the communication unit 150.

In addition, the connection sensing unit 140 may include a piezoelectric vibration sensor 162 sensing vibrations generated at the time of introduction of the rainwater runoff. That is, vibrations due to a flow of the rainwater runoff introduced into the collecting unit 130 or a pre-treating unit 280 to be described later may be observed as an electrical signal through the piezoelectric vibration sensor 162.

In this case, the connection sensing unit 140 may be activated through a signal generated by the piezoelectric vibration sensor 162 to measure whether or not the magnetic force of the magnet 148 is detected by the contactless sensor 146. That is, the connection sensing unit 140 may include the piezoelectric vibration sensor 162 to observe the vibrations due to the flow of the rainwater runoff introduced into the collecting unit 130 or a pre-treating unit 280 to be described later as the electrical signal to activate the connection sensing unit 140, the communication unit 150 and the like. Alternatively, measurement may start according to a predetermined period planned in advance without using the piezoelectric vibration sensor 162. That is, one or more contactless sensors 146 from which measurement is started according to the predetermined period planned in advance may be located at the outer portion of the spring cylinder 142.

The communication unit 150 transmits the signal sensed by the connection sensing unit 140 to the outside. Specifically, the communication unit 150 transmits the weight of the filtering unit 120 sensed by the connection sensing unit 140 to the outside. For example, the communication unit 150 may transmit the signal generated by the contactless sensor 146 sensing the magnet 148 to the outside. In this case, the connection sensing unit 140 may be activated through the signal generated by the piezoelectric vibration sensor 162 sensing the vibrations generated at the time of the introduction of the rainwater runoff to measure whether or not the magnetic force of the magnet 148 is detected by the contactless sensor 146 or it is measured whether or not the magnetic force of the magnet is detected according to a predefined period, and such an electrical signal may be transmitted to the outside as a weight measuring result value through the contactless sensor 146. In addition, the communication unit 150 may transmit signals sensed by piezoelectric vibration sensors 162 installed in various places of the rainwater runoff contaminant filtration apparatus 100 to the outside. The piezoelectric vibration sensor 162 may be installed in preparation for a case where the connection sensing unit 140 cannot sense the signal. It is preferable that the piezoelectric vibration sensor 162 is installed on the slope 134 of the collecting unit 130, an introduction part of the filtering unit 120, or the like, in order to sense whether or not the rainwater runoff is introduced, a water level of the filtering unit 120, and the like. In addition, in a case where it is determined that the filtering unit 120 needs to be cleaned or the strainer needs to be replaced, the communication unit 150 may transmit information on such a situation to the outside. In this case, the communication unit 150 may include a control module (not illustrated) to determine whether or not the filtering unit 120 is cleaned. To this end, the control module may be a microcontroller unit (MCU) including a memory for embedding a program. That is, the MCU serves as a brain and serves to perform control. The microcontroller unit may also include read only memory (ROM) and random access memory (RAM) circuits embedded therein, and is manufactured in a chip form.

For example, in a case where it is determined that the rainfall had ended by the spring cylinder 142 or the piezoelectric vibration sensor 162, the control module of the communication unit 150 may calculate a weight decrease rate of the filtering unit 120 using the contactless sensor 146 and the magnet 148. Here, the weight decrease rate of the filtering unit 120 refers to a rate at which the weight of the filtering unit 120 decreases due to evaporation of the rainwater runoff or outflow of the rainwater runoff over time from a point in time when the rainfall has ended. This is to measure a weight of contaminants that are not affected by the rainwater runoff. Thereafter, the control module may compare the weight of the filtering unit 120 with a reference weight value of the filtering unit 120 in a case where the weight decrease rate of the filtering unit 120 is within a reference range. Here, the reference range refers to a comparison value capable of detecting a point in time when only contaminants in a dried state remain in the filtering unit 120 due to the evaporation or the outflow of the rainwater runoff from the filtering unit 120. In addition, the reference weight value is a weight value of contaminants that may be accommodated by the filtering unit 120. That is, the reference weight value may correspond to a weight of the contaminants that does not limit the flow of the rainwater runoff and may be accommodated in the filtering unit 120.

Thereafter, the control module may determine whether or not to clean the filtering unit 120 on the basis of the weight of the filtering unit 120. That is, the control module determines that the filtering unit 120 needs to be cleaned in a case where the weight of the filtering unit 120 exceeds the reference weight value, and determines that the filtering unit 120 does not need to be cleaned when the weight of the filtering unit 120 does not exceed the reference weight value.

In addition, data transmitted to the communication unit 150 or information processed and generated by the communication unit 150 may be stored in an external device, a cloud platform or the like.

In addition, the communication unit 150 may use various wireless Internet or wireless communication networks such as a wireless fidelity (Wi-Fi) manner, 3G, 4G, and 5G. For example, the communication unit 150 may use an ultra-low power long-distance mobile communication network such as NB-IoT, LoRa, Wifi, Bluetooth low energy, and LTE-M.

Additionally, although not illustrated in the drawings, the rainwater runoff contaminant filtration apparatus 100 may further include a sensor unit (not illustrated), a power supplying unit (not illustrated), and the like.

The sensor unit may include a rainwater runoff amount sensor measuring an amount of the rainwater runoff introduced into the filtering unit 120, a water level sensor measuring a water level of the filtering unit 120, and a temperature and humidity sensor measuring a temperature and a humidity around the filtering unit 120. Roles of the rainwater runoff amount sensor and the water level sensor may also be played by the piezoelectric vibration sensor 162 described above. By using such a piezoelectric vibration sensor 162, it is possible to sense rainwater at the beginning of the rainfall or sense a case where the rainfall ends, measure an amount of the rainwater runoff introduced into the filtering unit 120 for a predetermined time, and measure an internal water level of the filtering unit 120.

The power supplying unit supplies power to the communication unit 150 and the like. The power supplying unit may supply the power using solar heat. For example, the power supplying unit may include a solar power generation element, a storage battery, an external power lead-in wire, and the like. The solar power generation element generates power using sunlight, the storage battery temporarily stores or supplies power generated from the solar power generation element, a battery or the like, and the external power lead-in wire leads in a power supply required for maintenance of a neighboring building or a public facility by installing an electric wire.

Figure 8:
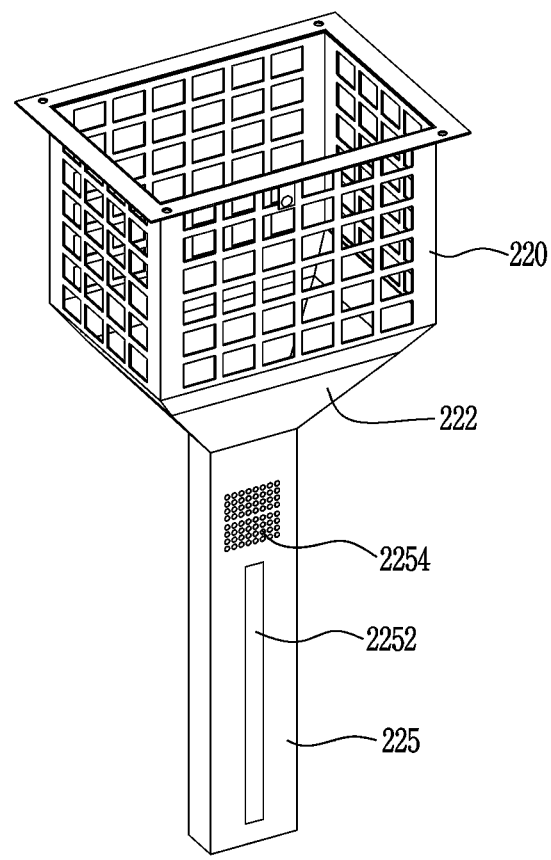
FIG. 8 is a view illustrating another example of a filtering unit having a drain tank pole in the rainwater runoff contaminant filtration apparatus of FIG. 1.

FIG. 8 is a view illustrating another example of a filtering unit having a drain tank pole in the rainwater runoff contaminant filtration apparatus of FIG. 1.

Referring to FIG. 8, the filtering unit 220 includes a drain tank pole including a connection slope 222 and a pole 225. The pole 225 for draining the rainwater and depositing contaminants is located below the filtering unit 220, and the connection slope 222 for easy movement of the rainwater and the contaminants is formed between the pole 225 and the filtering unit 220.

In this case, the contaminants are deposited inside the pole 225, and the rainwater is discharged to the outside through drain holes 2254 formed in the pole 225. Because the rainwater is discharged through the drain holes 2254 and the contaminants are deposited inside the pole 225, due to the drain tank pole including the connection slope 222 and the pole 225, only the filtering unit 220 including the drain tank pole may be used without using a separate filter bag. Here, the pole 225 may provide a deposition space of the contaminants, and provide a supporting force that may prevent a phenomenon in which the filtering unit 220 cannot endure an increase in the weight due to the introduction of the rainwater runoff, such that the filtering unit 220 falls.

In addition, a transparent window 2252 is formed on one surface of the pole 225 so that an inner portion of the pole 225 may be viewed. An amount of the contaminants deposited in the pole 225 may be confirmed through the transparent window 2252, and it may be determined whether or not to clean the inner portion of the pole 225 from such confirmation.

Figure 9:
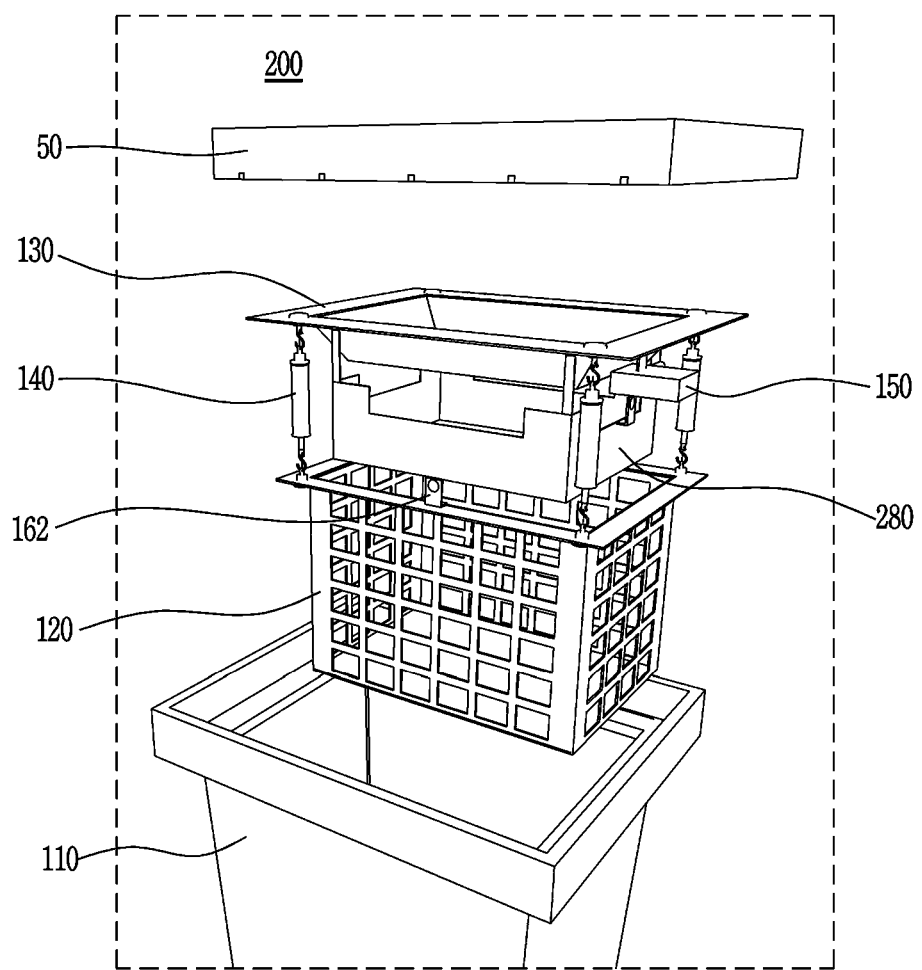
FIG. 9 is an exploded view of a rainwater runoff filtration apparatus according to another exemplary embodiment of the present invention.

FIG. 9 is an exploded view of a rainwater runoff filtration apparatus according to another exemplary embodiment of the present invention.

Referring to FIG. 9, the rainwater runoff filtration apparatus 200 according to another embodiment of the present invention further includes one or more pre-treating units 280 formed on one or more side surfaces, as compared with the rainwater runoff contaminant filtration apparatus 100 described above. Hereinafter, a detailed description for the body 110, the filtering unit 120, the collecting unit 130, the connection sensing unit 140, and the communication unit 150 will be omitted within the same category.

The pre-treating unit 280 precipitates coarse adulterations of the rainwater runoff before providing the collected rainwater runoff to an inner portion of the filtering unit 120. As illustrated in FIG. 8, the pre-treating unit 280 is located between a lower portion of the collecting unit 130 and an upper portion of the filtering unit 120 and serves to filter out the coarse adulterations of the rainwater runoff flowing from the collecting unit 130 to the filtering unit 120. In this case, the pre-treating unit 280 and the collecting unit 130 may be connected to each other by a hook ring or the like.

Figure 10:
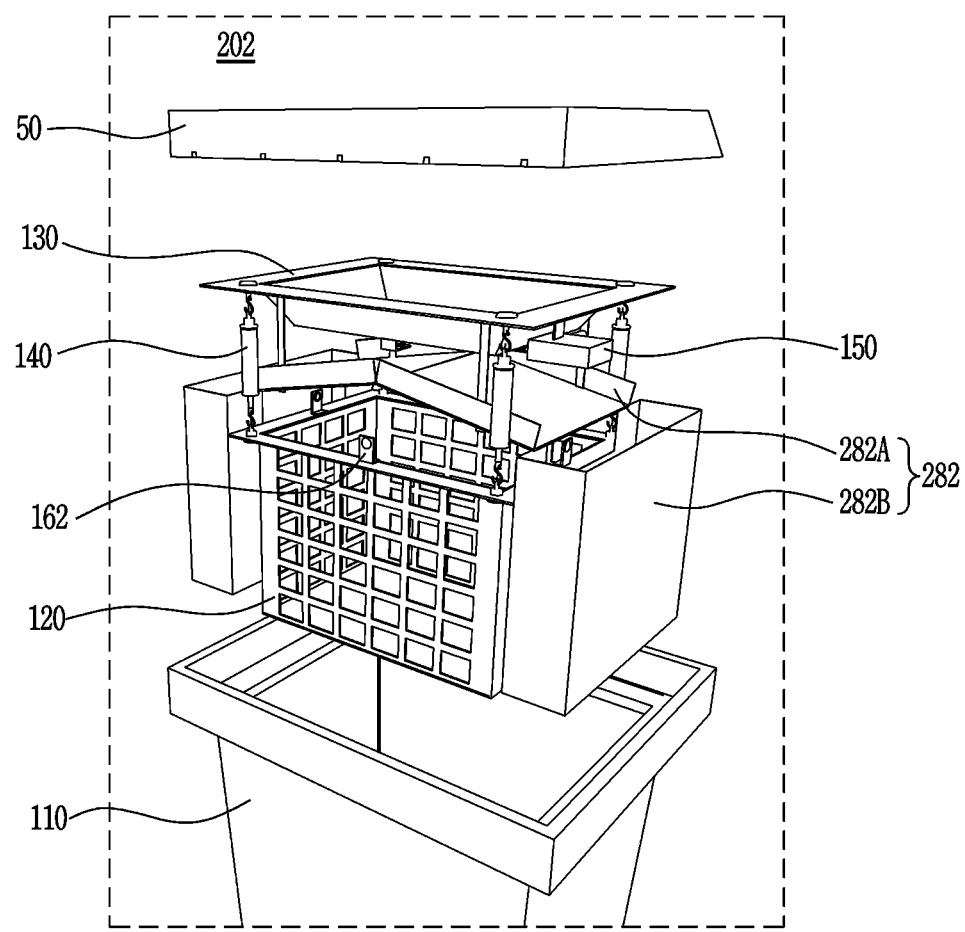
FIG. 10 is a view illustrating another example of a pretreatment unit in the rainwater runoff filtration apparatus of FIG. 9.

FIG. 10 is a view illustrating another example of a pretreatment unit in the rainwater runoff filtration apparatus of FIG. 9.

Referring to FIG. 10, the rainwater runoff filtration apparatus 202 of FIG. 10 is different in a structure of a pre-treating unit 282 from the rainwater runoff filtration apparatus 200 of FIG. 9. As illustrated in FIG. 10, the pre-treating unit 282 includes a diagonal structure 282A located between a lower portion of the collecting unit 130 and an upper portion of the filtering unit 120 and a side structure 282B located on a side surface of the filtering unit 120.

Figure 11:
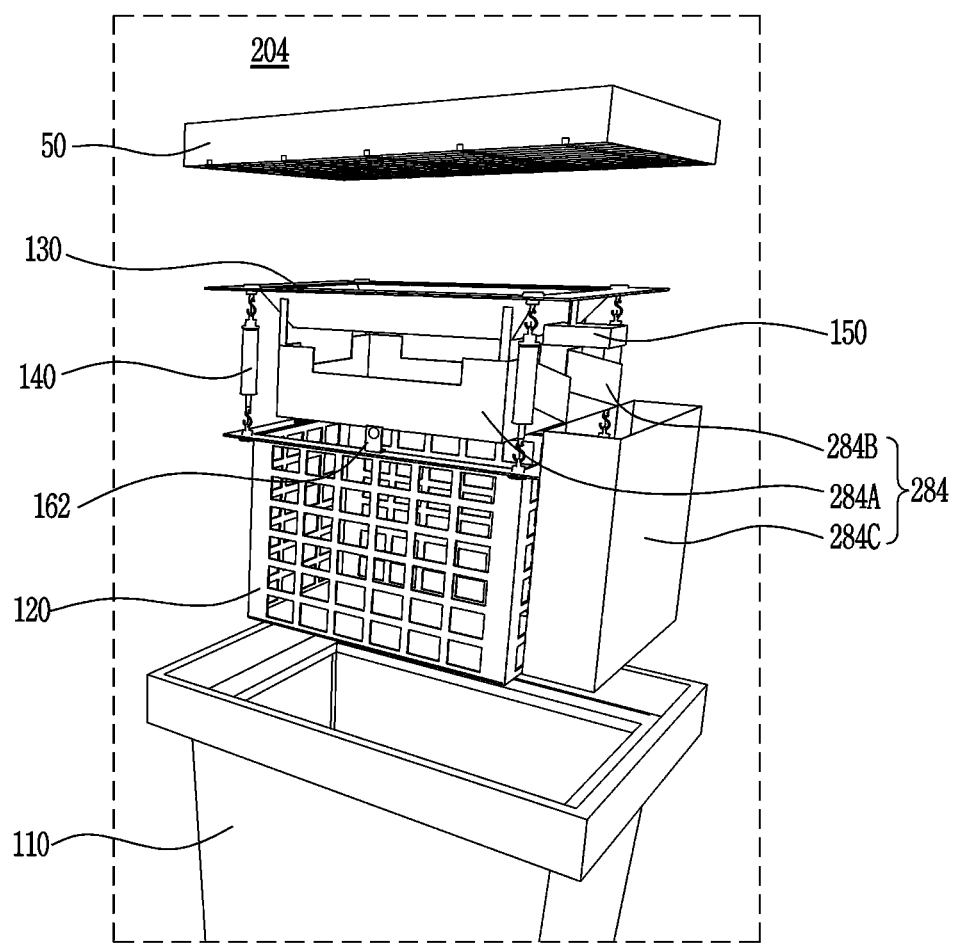
FIG. 11 is a view illustrating still another example of a pretreatment unit in the rainwater runoff filtration apparatus of FIG. 9.

FIG. 11 is a view illustrating still another example of a pretreatment unit in the rainwater runoff filtration apparatus of FIG. 9.

Referring to FIG. 11, the rainwater runoff filtration apparatus 204 of FIG. 11 is different in a structure of a pre-treating unit 284 from the rainwater runoff filtration apparatus 200 of FIG. 9 and the rainwater runoff filtration apparatus 202 of FIG. 10 As illustrated in FIG. 11, the pre-treating unit 284 includes an intermediate structure 284A located between a lower portion of the collecting unit 130 and an upper portion of the filtering unit 120, a diagonal connection structure 284B located at least one end of the intermediate structure 284A, and a side structure 284C located on a side surface of the filtering unit 120.

In FIGS. 9 to 11, the collecting unit 130 may be connected to the pre-treating unit 280, 282, or 284 by forming a hook ring (not illustrated) or may be connected to the pre-treating unit 280, 282, or 284 using a bolt, a nut and the like.

Figure 12:
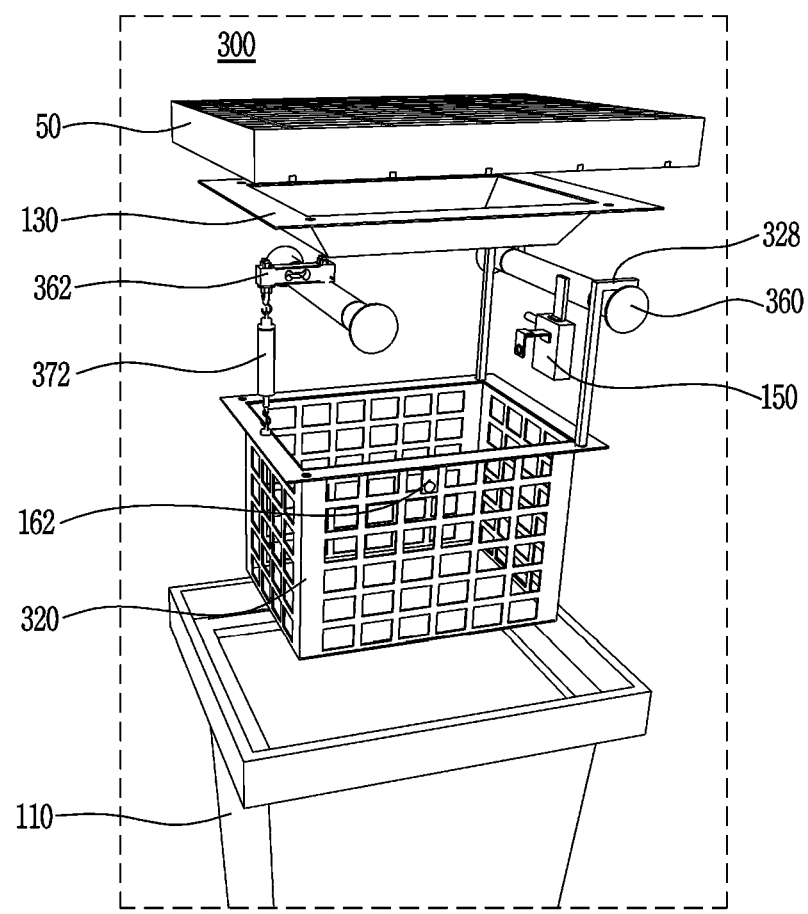
FIG. 12 is an exploded view of a rainwater runoff filtration apparatus according to still another exemplary embodiment of the present invention.

FIG. 12 is an exploded view of a rainwater runoff filtration apparatus according to still another exemplary embodiment of the present invention.

Referring to FIG. 12, the rainwater runoff filtration apparatus 300 according to still another embodiment of the present invention may be implemented by replacing the connection sensing unit 140 as compared with the rainwater runoff contaminant filtration apparatus 100 described above. Hereinafter, a detailed description for the body 110, the filtering unit 120, the collecting unit 130, the connection sensing unit 140, and the communication unit 150 will be omitted within the same category.

As illustrated in FIG. 12, a filtering unit 320 or the like may be connected using a compression rod 360 instead of the connection sensing unit 140. Specifically, the compression rod 360 may be supported on the body 110 or be installed on a wall of a vertical waterway, or the like, the filtering unit 320 having a filtering unit hook ring 328 may be installed by the filtering unit hook ring 328 hooked onto the compression rod 360, a weight sensor 362 measuring extension or compression according to sag of a filter strainer of the filtering unit 320 may be connected to the compression rod 360 and installed, and the weight sensor 362 and the filtering unit 320 may be connected to each other by a connection member 372.

Here, the collecting unit 130 may be fixed in a hinge form to the compression rod 360 that may be supported on the body 110 or be installed on the wall of the vertical waterway, or the like.

Therefore, the contactless sensor 146 may be replaced by the weight sensor 362, and connection configurations of the collecting unit 130 and the filtering unit 320 may be hooked onto the compression rod 360 with the filtering unit hook ring 328 or be connected to the compression rod 360 by a hinge or the like.

Figure 13:
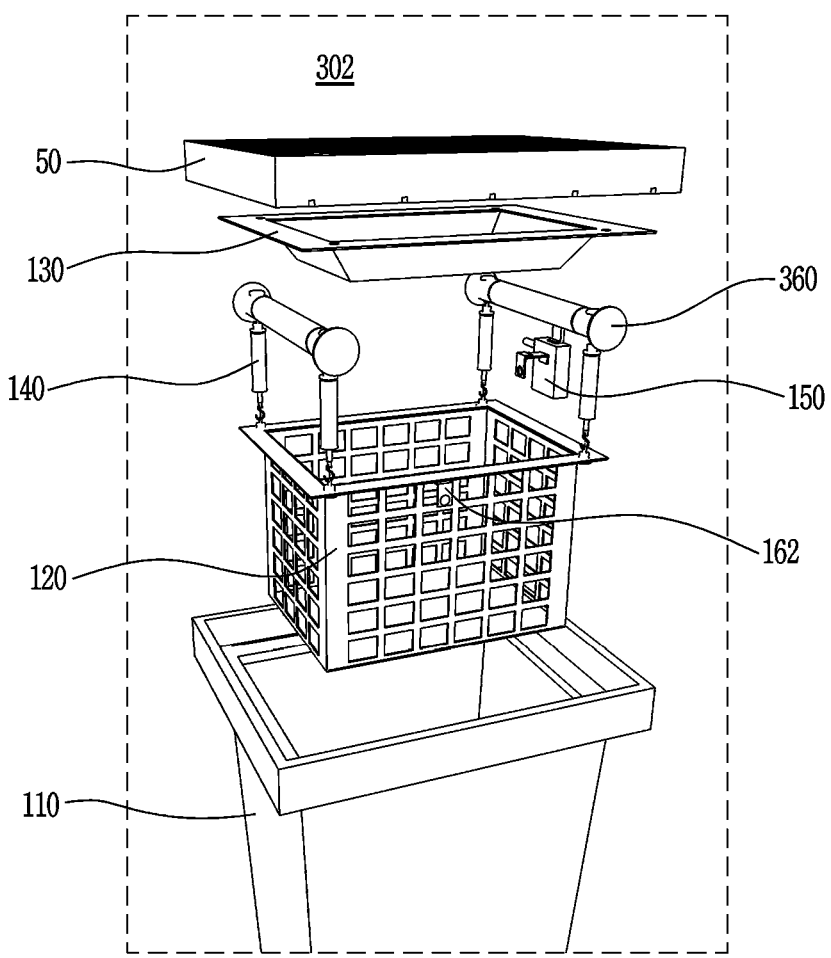
FIG. 13 is a view illustrating another example of a structure connected to a compression rod in the rainwater runoff filtration apparatus of FIG. 9.

FIG. 13 is a view illustrating another example of a structure connected to a compression rod in the rainwater runoff filtration apparatus of FIG. 9.

As illustrated in FIG. 13, a connection sensing unit 140 may be connected directly to a compression rod 360 installed on a wall of a vertical waterway, or the like, and the filtering unit 120 described above may be connected to the connection sensing unit 140. Here, the collecting unit 130 may be connected to the connection sensing unit 140 by a method in which it is fixed in a hinge form to the compression rod 360 that may be supported on the body 110 or be installed on the wall of the vertical waterway, or the like.

Figure 14:
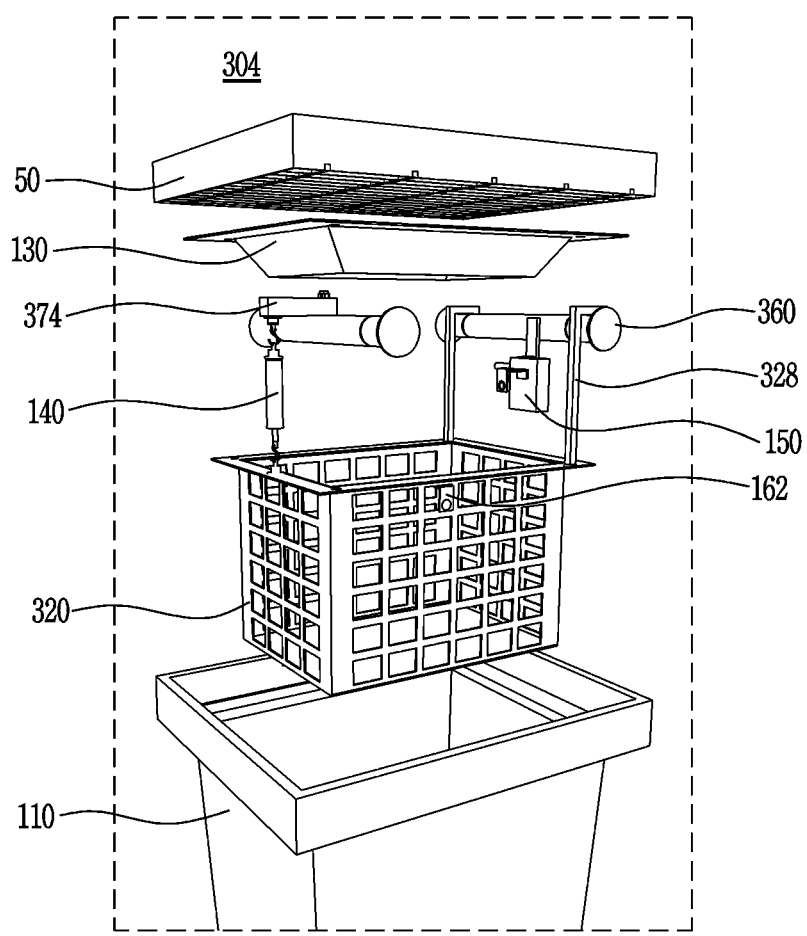
FIG. 14 is a view illustrating still another example of a structure connected to a compression rod in the rainwater runoff filtration apparatus of FIG. 9.

FIG. 14 is a view illustrating still another example of a structure connected to a compression rod in the rainwater runoff filtration apparatus of FIG. 9.

As illustrated in FIG. 14, the compression rod 360 may be supported on the body 110 or be installed on a wall of a vertical waterway, or the like, the filtering unit 320 having a filtering unit hook ring 328 may be installed by the filtering unit hook ring 328 hooked onto the compression rod 360, a pressure sensor 374 measuring a pressure of the spring cylinder 142 of the connection sensing unit 140 may be installed to be connected to the compression rod 360, and the pressure sensor 374 and the filtering unit 320 may be connected to each other by the connection sensing unit 140.

Here, the collecting unit 130 may be fixed in a hinge form to the compression rod 360 that may be supported on the body 110 or be installed on the wall of the vertical waterway, or the like.

Therefore, the contactless sensor 146 may be replaced by the pressure sensor 374, and connection configurations of the collecting unit 130 and the filtering unit 320 may be hooked onto the compression rod 360 with the filtering unit hook ring 328 or be connected to the compression rod 360 by fixing the connection configurations to the compression rod 360 with a front end portion compressive force by a hinge or the like.

Figure 15:
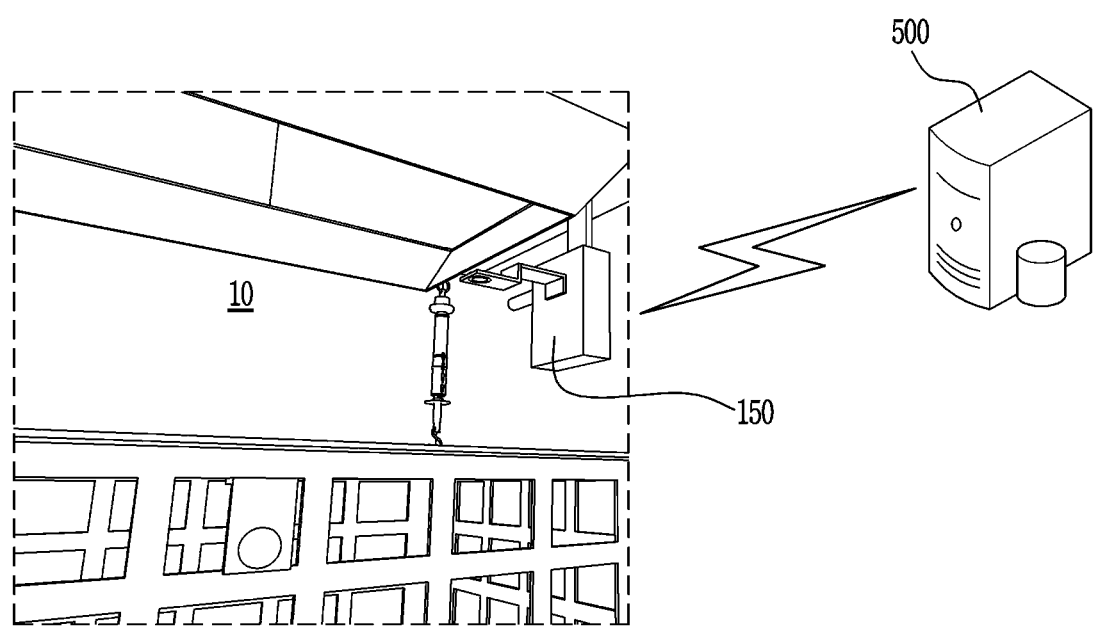
FIG. 15 is a view illustrating a concept of a monitoring system of the rainwater runoff contaminant filtration apparatus according to an exemplary embodiment of the present invention.

FIG. 15 is a view illustrating a concept of a monitoring system of the rainwater runoff contaminant filtration apparatus according to an exemplary embodiment of the present invention.

Referring to FIG. 15, the monitoring system 10 of the rainwater runoff contaminant filtration apparatus includes the rainwater runoff contaminant filtration apparatus 100 and a remote control device 500.

In this case, a detailed configuration of the rainwater runoff contaminant filtration apparatus 100 has been described above, and a detailed description therefor will thus be omitted below. Here, it will be apparent that the rainwater runoff contaminant filtration apparatus 100 may be replaced by the rainwater runoff contaminant filtration apparatuss 200, 202, 204, 300, 302, and 304 according to other exemplary embodiments.

The remote control device 500 determines whether or not to clean the rainwater runoff contaminant filtration apparatus 100 on the basis of information on whether or not the rainwater runoff has been introduced and weight information, transmitted from the communication unit 150.

As described above, it may be determined by the communication unit 150 of the rainwater runoff contaminant filtration apparatus 100 whether or not to clean the filtering unit 120, whether or not to replace the strainer, or the like. However, the external control device 500 receives signals detected by the connection sensing unit 140 and the like of the rainwater runoff contaminant filtration apparatus 100 through the communication unit 150 and performs determination, such that only sensing and communication functions may be applied to and utilized in an existing underground buried non-point pollution reduction facility, or the like.

Because the external control device 500 may receive the weight information and the like, environmental information may be monitored using the rainwater runoff contaminant filtration apparatus 100, and the rainwater runoff contaminant filtration apparatus 100 may be used as an automatic weather system (AWS). To this end, the external control device 500 may include a communication module (not illustrated) capable of communicating with the rainwater runoff contaminant filtration apparatus 100, a determining module (not illustrated) determining whether or not to clean the filtering unit 120, a storage module (not illustrated) storing information transmitted from the communication module and information determined by the determining module, and the like. In addition, a single external control device 500 has a function of communicating with a plurality of filtration apparatuses 100, such that the external control device 500 may compare whether or not the rainwater runoff is introduced and collected amounts of contaminants measured for each filtration apparatuses 100 with each other to determine whether or not a peripheral filtration apparatus 100 of a specific filtration apparatus 100 is normally operated.

In addition, in a case where the external control device 500 determines whether or not to clean the filtering unit 120, the external control device 500 may generate a cleaning necessary alarm and notify a manager of the cleaning necessary alarm. To this end, the external control device 500 may include a display displaying visual information, a speaker generating a warning sound, a light emitting device notifying the manager of a warning with light, and the like.

Although exemplary embodiments of the present invention have been described with reference to the accompanying drawings, those skilled in the art will appreciate that various modifications and alterations may be made without departing from the spirit or essential feature of the present invention. Therefore, it is to be understood that the exemplary embodiments described above are illustrative rather than being restrictive in all aspects.

The invention claimed is:

1. A rainwater runoff contaminant filtration apparatus comprising:
    a body having an open top end permitting rainwater runoff to enter and an outlet formed in lower portion of said body, through which rainwater runoff may exit;
    a filter basket located inside said body for receiving the rainwater runoff introduced into said open top end and removing at least some contaminants from said rainwater runoff as it passes through said filter basket;
    a collector located above said filter basket, said collector having an inlet directing rainwater runoff into said filter basket;
    a connection and sensing unit including a spring cylinder connecting said filter basket to said collector, a contactless sensor located at an outer portion of the spring cylinder and a magnet located at an inner portion of the spring cylinder, said magnet moving in accordance with movement of the spring cylinder, said contactless sensor sensing a weight of said filter basket on the basis of reciprocation of the spring cylinder and the location of said magnet; and
    a signal transmitter for transmitting a signal corresponding to the weight of said filter basket as sensed by said contactless sensor, to a location remote from said apparatus.

2. The rainwater runoff contaminant filtration apparatus of claim 1, wherein said body includes an inwardly extending ledge upon which said collector is supported.

3. The rainwater runoff contaminant filtration apparatus of claim 1, wherein said filter basket has a plurality of filtering holes formed in each of a plurality of side surfaces and a lower surface thereof, each filtering hole having a predetermined size.

4. The rainwater runoff contaminant filtration apparatus of claim 3, further including a filter bag disposed within said filter basket.

5. The rainwater runoff contaminant filtration apparatus of claim 3, wherein said filter basket is rectangular.

6. The rainwater runoff contaminant filtration apparatus of claim 1, wherein said collector has a shape in which a cross-sectional diameter of said inlet gradually decreases from the top to the bottom, and said collector is supported on said body by a ledge.

7. The rainwater runoff contaminant filtration apparatus of claim 1, further comprising a pre-treatment unit arranged between said collector and said filter basket.

8. The rainwater runoff contaminant filtration apparatus of claim 1, wherein said connection and sensing unit includes a piezoelectric vibration sensor to sense vibrations due to a flow of the rainwater runoff introduced into said collector or a pre-treating unit, and generate an electrical signal operative to activate said connection and sensing unit and said signal transmitter.

9. The rainwater runoff contaminant filtration apparatus of claim 8, wherein said contactless sensor of said connection and sensing unit are switched to an operational state by an activated electrical signal of said piezoelectric vibration sensor or by a starting measurement according to a predetermined time period.

10. A monitoring system of a rainwater runoff contaminant filtration apparatus, comprising:
    the rainwater runoff contaminant filtration apparatus of claim 1; and
    a remote control device determining whether or not to clean said filter basket on the basis of a weight information signal transmitted by said signal transmitter.

* * * * *